United States Patent
Song et al.

(10) Patent No.: US 9,746,714 B2
(45) Date of Patent: Aug. 29, 2017

(54) DISPLAY DEVICE AND METHOD OF MANUFACTURING THE SAME

(71) Applicant: Samsung Display Co., Ltd., Yongin-si (KR)

(72) Inventors: Dae Ho Song, Hwaseong-si (KR); Jae Cheol Park, Hwaseong-si (KR); Seong Gyu Kwon, Suwon-si (KR); You Young Jin, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/017,875

(22) Filed: Feb. 8, 2016

(65) Prior Publication Data
US 2016/0320670 A1    Nov. 3, 2016

(30) Foreign Application Priority Data
Apr. 30, 2015    (KR) .................. 10-2015-0061602

(51) Int. Cl.
*G02F 1/1337*    (2006.01)
*G02F 1/1333*    (2006.01)
(Continued)

(52) U.S. Cl.
CPC ........ *G02F 1/133711* (2013.01); *C09K 19/56* (2013.01); *G02F 1/1341* (2013.01);
(Continued)

(58) Field of Classification Search
CPC ........... G02F 1/133711; G02F 1/13337; G02F 1/1341; G02F 1/1368; G02F 2001/133715; G02F 2001/133746; G02F 2001/133749; C09K 19/56; Y10T 428/10; Y10T 428/1005; Y10T 428/1014
(Continued)

(56) References Cited

U.S. PATENT DOCUMENTS 7,169,449 B2    1/2007 Nakanishi et al.
2002/0080320 A1*    6/2002 Suzuki .............. G02F 1/133707
                                                            349/153
(Continued)

FOREIGN PATENT DOCUMENTS

JP    2008033117    2/2008
JP    2008242031    10/2008
(Continued)

*Primary Examiner* — Ruiyun Zhang
(74) *Attorney, Agent, or Firm* — Cantor Colburn, LLP

(57) ABSTRACT

A display device includes a substrate, a thin film transistor positioned on the substrate, a pixel electrode connected to the thin film transistor, an alignment layer positioned on the pixel electrode, a liquid crystal layer including liquid crystal molecules formed on the alignment layer and positioned in a plurality of microcavities, a roof layer positioned such that the roof layer is spaced apart from the pixel electrode with a microcavity interposed therebetween, and an overcoat positioned on the roof layer and covering a trench positioned between the plurality of microcavities, in which the liquid crystal layer, a pre-tilt angle manifestation group positioned to be adjacent to the alignment layer is formed, and the pre-tilt angle manifestation group includes a polymer of a compound represented by Chemical Formula 1.

14 Claims, 19 Drawing Sheets

(51) Int. Cl.
  *G02F 1/1341*   (2006.01)
  *C09K 19/56*   (2006.01)
  *C09K 19/54*   (2006.01)

(52) U.S. Cl.
  CPC .. *G02F 1/133377* (2013.01); *C09K 2019/548* (2013.01); *G02F 2001/133746* (2013.01); *Y10T 428/10* (2015.01); *Y10T 428/1005* (2015.01)

(58) Field of Classification Search
  USPC ........... 428/1.1, 1.2, 1.23; 349/43, 123, 134, 349/135; 438/30
  See application file for complete search history.

(56) References Cited

U.S. PATENT DOCUMENTS

| | | | |
|---|---|---|---|
| 2003/0156247 | A1 | 8/2003 | Kishida et al. |
| 2009/0258155 | A1* | 10/2009 | Odell ...................... C09D 4/00 427/519 |
| 2014/0176893 | A1* | 6/2014 | Sugitani ............ G02F 1/133305 349/143 |

FOREIGN PATENT DOCUMENTS

| | | |
|---|---|---|
| JP | 2012032601 | 2/2012 |
| KR | 1020020047748 | 6/2002 |
| KR | 1020140146425 | 12/2014 |

* cited by examiner

DISPLAY DEVICE AND METHOD OF MANUFACTURING THE SAME

This application claims priority to Korean Patent Application No. 10-2015-0061602 filed on Apr. 30, 2015, and all the benefits accruing therefrom under 35 U.S.C. §119, the entire content of which is hereby incorporated by reference.

BACKGROUND (a) Field

The present invention relates to a display device and a method of manufacturing the same.

(b) Description of the Related Art

A liquid crystal display is one of the most common types of flat panel displays currently in use. A liquid crystal display generally includes two display panels with field generating electrodes such as a pixel electrode and a common electrode, and a liquid crystal layer interposed therebetween. The liquid crystal display displays an image by applying a voltage to a field generating electrode to generate an electric field on the liquid crystal layer, determining the alignment of liquid crystal molecules in the liquid crystal layer, and controlling the polarization of incident light.

The two display panels constituting the liquid crystal display may be formed by a thin film transistor array panel and a counter display panel. In the thin film transistor array panel, a gate line transferring a gate signal and a data line transferring a data signal are formed to cross each other, and a thin film transistor connected to the gate line and the data line, a pixel electrode connected to the thin film transistor, and the like may be formed. A light blocking member, a color filter, a common electrode and the like may be formed on the counter display panel. If necessary, the light blocking member, the color filter and the common electrode may be formed on the thin film transistor array panel.

However, in existing liquid crystal displays, there are disadvantages associated with the use of and that constituent elements are formed on each of the two substrates. Thus, such a display device is heavy and thick, the cost thereof is high and processing time is long in duration.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a display device where a pre-tilt angle of liquid crystal molecules is formed by an efficient process using a resin component included in an overcoat in the display device, and where the display device is manufactured by using one substrate. A method of manufacturing the same is also provided.

An exemplary embodiment of the present invention provides a display device including: a substrate, a thin film transistor positioned on the substrate, a pixel electrode connected to the thin film transistor, an alignment layer positioned on the pixel electrode, a liquid crystal layer including liquid crystal molecules formed on the alignment layer and positioned in a plurality of microcavities, a roof layer positioned such that the roof layer is spaced apart from the pixel electrode with a microcavity interposed therebetween, and an overcoat positioned on the roof layer and covering a trench positioned between the plurality of microcavities, in which in the liquid crystal layer, a pre-tilt angle manifestation group positioned to be adjacent to the alignment layer is formed, and the pre-tilt angle manifestation group includes a polymer of a compound represented by the following Chemical Formula 1:

[Chemical Formula 1]

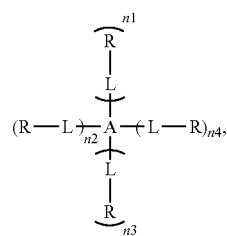

$(R-L)_{n2}-A-(L-R)_{n4}$, where, L is each independently a single bond, an alkylene group, or an ester group, R is each independently an alkenyl group or a vinyl group, A is a trivalent or tetravalent aliphatic organic group or alicyclic organic group, a sum of n1 to n4 is 3 or 4, and n1 to n4 are each 0 or 1.

In an aspect of the exemplary embodiment, Chemical Formula 1 may include at least one compound selected from the following Chemical Formulas 1-1 to 1-3:

[Chemical Formula 1-1]

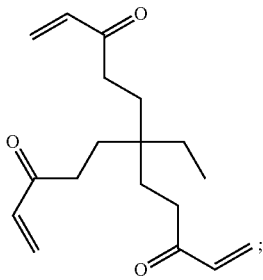

;

[Chemical Formula 1-2]

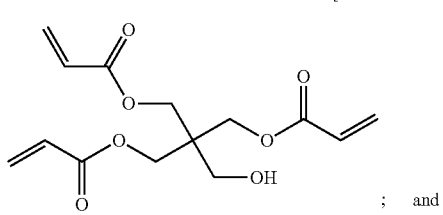

; and

[Chemical Formula 1-3]

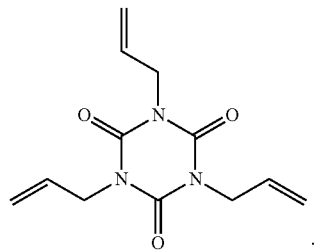

.

In another aspect of the exemplary embodiment, the liquid crystal molecule may be disposed to form a pre-tilt on a surface of the pixel electrode.

In another aspect of the exemplary embodiment, the pre-tilt of the liquid crystal molecule may form a pre-tilt angle of about 85 degrees (°) to about 89°, based on the surface of the pixel electrode.

In still another aspect of the exemplary embodiment, the pre-tilt angle manifestation group may further include a photoreaction group.

In still yet another aspect of the exemplary embodiment, the photoreaction group may include a compound represented by the following Chemical Formula 2:

[Chemical Formula 2]

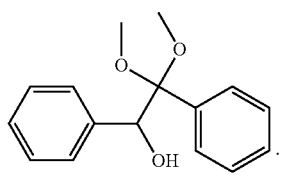

In another aspect of the exemplary embodiment, the pre-tilt angle manifestation group may further include a polymerization reaction group.

In still another aspect of the exemplary embodiment, the polymerization reaction group may include a compound represented by the following Chemical Formula 3:

[Chemical Formula 3]

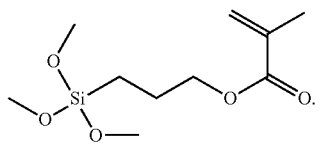

In another aspect of the exemplary embodiment, the liquid crystal layer may include the compound represented by Chemical Formula 1.

In still another aspect of the exemplary embodiment, the overcoat may include the compound represented by Chemical Formula 1.

Another exemplary embodiment of the present invention provides a method of manufacturing a display device, including: forming a thin film transistor on a substrate, forming a pixel electrode connected to the thin film transistor on the thin film transistor, forming a sacrificial layer on the pixel electrode, forming a roof layer including an entrance portion by applying an organic material on the sacrificial layer and patterning the organic material, forming a plurality of microcavities between the roof layer and the pixel electrode by removing the sacrificial layer, forming an alignment layer by injecting an aligning agent through the entrance portion into the microcavity, forming a liquid crystal layer by injecting a liquid crystal including liquid crystal molecules through the entrance portion, and forming an overcoat covering the entrance portion on the roof layer to encapsulate the plurality of microcavities and including a compound represented by the following Chemical Formula 1, in which the forming of the overcoat includes pseudo-curing the overcoat, and applying a voltage to the pixel electrode to perform exposure to form a pre-tilt angle manifestation group in the alignment layer:

[Chemical Formula 1]

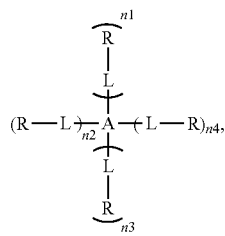

where, L is each independently a single bond, an alkylene group, or an ester group, R is each independently an alkenyl group or a vinyl group, A is a trivalent or tetravalent aliphatic organic group or an alicyclic organic group, a sum of n1 to n4 is 3 or 4, and n1 to n4 are each 0 or 1.

In an aspect of the exemplary embodiment, the pseudo-curing of the overcoat may be performed so that the overcoat is cured by about 40 percent (%) to about 80%.

In another aspect of the exemplary embodiment, the pseudo-curing of the overcoat may be performed through exposure.

In still another aspect of the exemplary embodiment, the pseudo-curing may be performed through exposure by energy of about 0.5 Joules (J) to about 4.0 J.

In another aspect of the exemplary embodiment, the forming of the overcoat may further include, after forming the pre-tilt angle manifestation group, main-curing the overcoat.

According to the exemplary embodiments of the present invention, in a display device manufactured by using one substrate, a pre-tilt angle of liquid crystal molecules can be formed by an efficient process using a resin component included in an overcoat.

Further, the pre-tilt angle of the liquid crystal molecules can be formed without a reactive mesogen by including the resin component in the overcoat.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
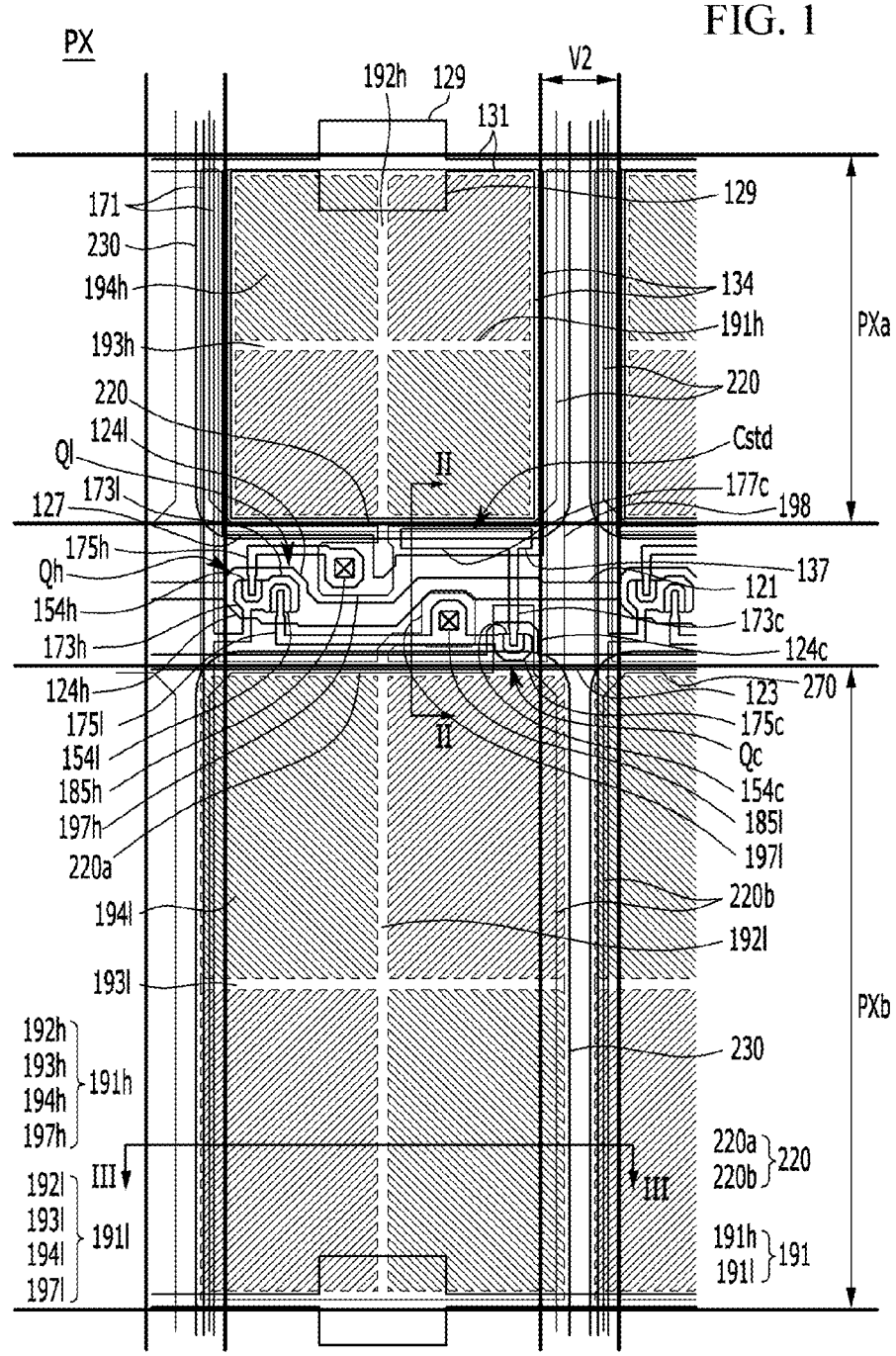
FIG. 1 is a top plan layout view of an exemplary embodiment of a pixel according to the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Recently, a technology where a plurality of microcavities that are a tunnel-type structure is formed on one substrate and a liquid crystal is injected into the structure to manufacture a display device has been developed. The color filter is generally formed between the substrate and the microcavity, or is formed on the microcavity.

First, an exemplary embodiment of a display device will be described with reference to FIGS. 1 to 3.

FIG. 1 is a top plan layout view of an exemplary embodiment of a pixel. FIG. 2 is a cross-sectional view taken along line II-II of FIG. 1. FIG. 3 is a cross-sectional view taken along line of FIG. 1.

In an exemplary embodiment, a liquid crystal display includes an insulating substrate 110 made from a material such as glass or plastics, and a roof layer 360 disposed on the insulating substrate 110.

A plurality of pixels PX is positioned (or disposed) on the insulating substrate 110. The plurality of pixels PX is disposed in a matrix form which includes a plurality of pixel rows and a plurality of pixel columns. In an aspect of the exemplary embodiment, one pixel PX is a region overlapping one pixel electrode, and includes a first subpixel PXa and a second subpixel PXb. The first subpixel PXa overlaps a first subpixel electrode 191*h*, and the second subpixel PXb overlaps a second subpixel electrode 191*l*. In another aspect of the exemplary embodiment, the first subpixel PXa and the second subpixel PXb may be disposed in a vertical direction in an extension direction of a data line 171.

A trench V1 is positioned in an extension direction of a gate line between the first subpixel PXa and the second subpixel PXb, and a partition wall V2 is positioned between columns of the adjacent pixel regions. In the trench V1, as will be described later, an overcoat 390 may be formed.

In an aspect of the exemplary embodiment, the roof layer 360 is formed in the extension direction of the data line 171. The trench V1 and the roof layer 360 are removed to form an entrance portion 307 corresponding to a portion where an aligning material or a liquid crystal material is injected into a microcavity 305.

In another aspect of the exemplary embodiment, the roof layers 360 corresponding to the microcavity 305 may be connected at a portion overlapping the data line 171 to form the partition wall V2, and the partition wall V2 may serve to compartmentalize the microcavity 305.

The aforementioned structure of the exemplary embodiment of the display device is just an example, and various modifications are feasible. In another exemplary embodiment, an arrangement of the pixel PX, the trench V1, and the partition wall V2 can be changed, the roof layers 360 may be connected to each other in the trench V1, and a portion of each roof layer 360 may be formed to be spaced apart from the substrate 110 at the partition wall V2 to connect the adjacent microcavities 305 to each other.

Figure 2:
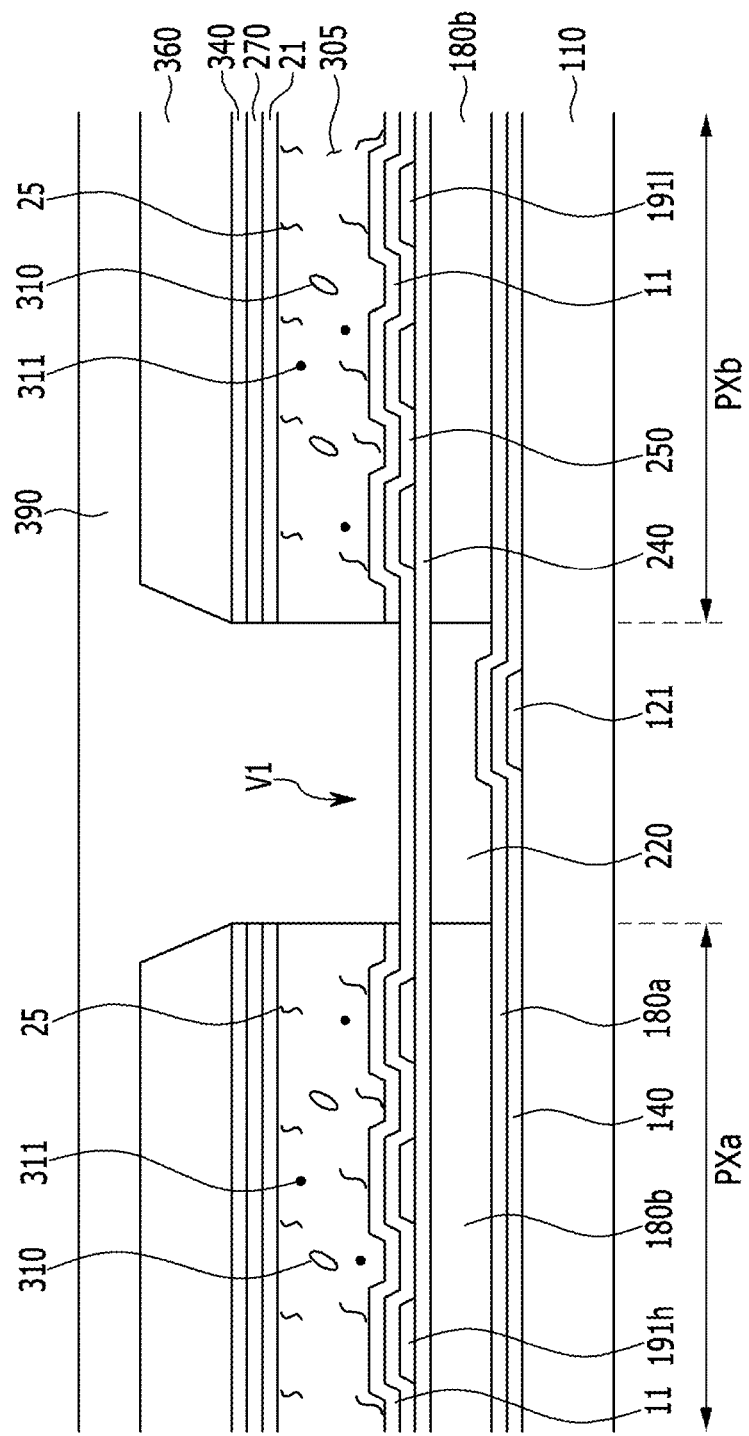
FIG. 2 is a cross-sectional view taken along line II-II of FIG. 1.
Figure 3:
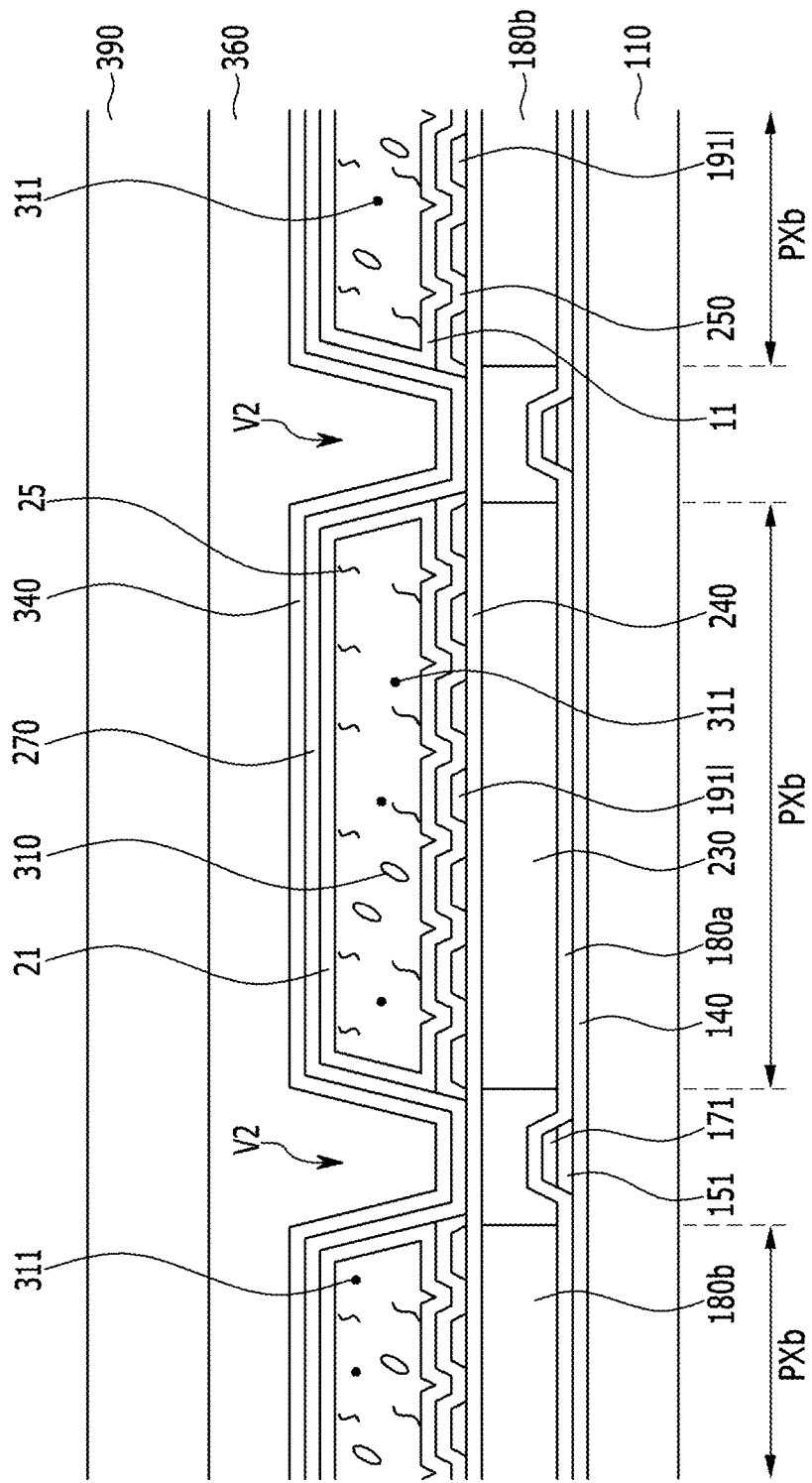
FIG. 3 is a cross-sectional view taken along line of FIG. 1.

Referring to FIGS. 1 and 2, in an exemplary embodiment, a plurality of gate conductors including a plurality of gate lines 121, a plurality of step-down gate lines 123, and a plurality of storage electrode lines 131 are positioned on the insulating substrate 110.

The gate line 121 and the step-down gate line 123 mainly extend in a substantially horizontal direction and transfer a gate signal. The gate conductor further includes a first gate electrode 124h and a second gate electrode 124l protruding upwardly and downwardly from the gate line 121, and further includes a third gate electrode 124c upwardly protruding from the step-down gate line 123. The first gate electrode 124h and the second gate electrode 124l are connected to each other to form one protrusion portion. In another exemplary embodiment, protrusion forms of the first, second, and third gate electrodes 124h, 124l, and 124c can be modified.

The storage electrode line 131 mainly extends in a substantially horizontal direction and transfers a predetermined voltage such as a common voltage ("Vcom"). The storage electrode line 131 includes a storage electrode 129 that protrudes upwardly and downwardly, a pair of vertical portions 134 that substantially vertically extend downwardly with respect to the gate line 121, and a horizontal portion 127 through which ends of the pair of vertical portions 134 are connected to each other. The horizontal portion 127 includes a capacitive electrode 137 extending downwardly.

A gate insulating layer 140 is positioned on the gate conductors 121, 123, 124h, 124l, 124c, and 131. In an exemplary embodiment, the gate insulating layer 140 may be formed from an inorganic insulating material such as silicon nitride (SiNx) and/or silicon oxide (SiOx). In another exemplary embodiment, the gate insulating layer 140 may be formed of a single layer or a multilayer.

A first semiconductor layer 154h, a second semiconductor layer 154l, and a third semiconductor layer 154c are positioned on the gate insulating layer 140. The first semiconductor layer 154h may be positioned on the first gate electrode 124h, the second semiconductor layer 154l may be positioned on the second gate electrode 124l, and the third semiconductor layer 154c may be positioned on the third gate electrode 124c. The first semiconductor layer 154h and the second semiconductor layer 154l may be connected to each other, and the second semiconductor layer 154l and the third semiconductor layer 154c may be connected to each other. Further, the first semiconductor layer 154h may include a semiconductor line 151 formed to extend beneath the data line 171. The first to third semiconductor layers 154h, 154l, and 154c may be formed from amorphous silicon, polycrystalline silicon and/or metal oxide, or the like.

Ohmic contacts (not shown) may be further positioned on each of the first to third semiconductor layers 154h, 154l, and 154c. The ohmic contacts may be made from a material such as silicide or n+ hydrogenated amorphous silicon to which an n-type impurity is doped.

Data conductors including a data line 171, a first source electrode 173h, a second source electrode 173l, a third source electrode 173c, a first drain electrode 175h, a second drain electrode 175l, and a third drain electrode 175c are positioned on the first to third semiconductor layers 154h, 154l, and 154c.

The data line 171 transfers a data signal and mainly extends in a substantially vertical direction to cross the gate line 121 and the step-down gate line 123. Each data line 171 includes the first source electrode 173h and the second source electrode 173l that extend toward the first gate electrode 124h and the second gate electrode 124l and are connected to each other.

The first drain electrode 175h, the second drain electrode 175l, and the third drain electrode 175c include a wide end portion and a rod-shaped end portion. The rod-shaped end portions of the first drain electrode 175h and the second drain electrode 175l, respectively, are partially surrounded by the first source electrode 173h and the second source electrode 173l, respectively. The wide end portion of the second drain electrode 175l further extends to form the third source electrode 173c that is bent to have a U-shape. The wide end portion 177c of the third drain electrode 175c overlaps the capacitive electrode 137 to form a step-down capacitor ("Cstd"), and the rod-shaped end portion is partially surrounded by the third source electrode 173c.

The first gate electrode 124h, the first source electrode 173h, and the first drain electrode 175h form a first thin film transistor Qh, and together with the first semiconductor layer 154h, the second gate electrode 124l, the second source electrode 173l, and the second drain electrode 175l, form a second thin film transistor Ql, together with the second semiconductor layer 154l, and the third gate electrode 124c, the third source electrode 173c, and the third drain electrode 175c form a third thin film transistor Qc, together with the third semiconductor layer 154c.

The first semiconductor layer 154h, the second semiconductor layer 154l, and the third semiconductor layer 154c may be connected to each other to form stripes, and may have a plane shape that is substantially the same as those of the data conductors 171, 173h, 173l, 173c, 175h, 175l, and 175c and the ohmic contacts therebeneath with the exception of channel regions (not shown) between the source electrodes 173h, 173l, and 173c and the drain electrodes 175h, 175l, and 175c.

In the first semiconductor layer 154h, there is a portion that is not covered by the first source electrode 173h and the first drain electrode 175h but is exposed between the first source electrode 173h and the first drain electrode 175h. In the second semiconductor layer 154l, there is a portion that is not covered by the second source electrode 173l and the second drain electrode 175l but is exposed between the second source electrode 173l and the second drain electrode 175l. In the third semiconductor layer 154c, there is a portion that is not covered by the third source electrode 173c and the third drain electrode 175c but is exposed between the third source electrode 173c and the third drain electrode 175c.

A first passivation layer 180a is positioned on the data conductors 171, 173h, 173l, 173c, 175h, 175l, and 175c, and the semiconductor layers 154h, 154l, and 154c exposed between each of the source electrodes 173h, 173l, and 173c and each of the drain electrodes 175h, 175l, and 175c. In an exemplary embodiment, the first passivation layer 180b may be formed of an organic insulating material or an inorganic insulating material, or the like, and may be formed of a single layer or a multilayer.

Next, a second passivation layer 180b and a light blocking member 220 are positioned on the first passivation layer 180a.

The light blocking member 220 is positioned in a region where a thin film transistor is positioned. The light blocking member 220 may be positioned on a boundary portion of the pixel PX and the thin film transistor to prevent light leakage. The second passivation layer 180b may be positioned in each of the first subpixel PXa and the second subpixel PXb, and the light blocking member 220 may be positioned between the first subpixel PXa and the second subpixel PXb.

The light blocking member 220 extends in an extension direction of the gate line 121 and the step-down gate line 123 to expand upwardly and downwardly. In an exemplary embodiment, the light blocking member 220 may cover a region in which the first thin film transistor Qh, the second thin film transistor Ql, the third thin film transistor Qc, and the like are positioned, or may extend along the data line 171. That is, the light blocking member 220 may be positioned in the trench V1 and the partition wall V2. In another exemplary embodiment, the second passivation layer 180b and the light blocking member 220 may overlap each other in some regions.

A plurality of first contact holes 185h and a plurality of second contact holes 185l through which the wide end portion of the first drain electrode 175h and the wide end portion of the second drain electrode 175l are exposed are formed in the first passivation layer 180a, the second passivation layer 180b, and the light blocking member 220.

A first insulating layer 240 is positioned on the second passivation layer 180b and the light blocking member 220, and a pixel electrode 191 is positioned on the first insulating layer 240. In an exemplary embodiment, the pixel electrode 191 may be formed of a transparent metal material such as indium-tin oxide ("ITO") and/or indium-zinc oxide ("IZO") or the like.

The pixel electrode 191 includes the first subpixel electrode 191h and the second subpixel electrode 191l, which are separated from each other while the gate line 121 and the step-down gate line 123 are interposed therebetween, and disposed on and beneath the pixel PX based on the gate line 121, and the step-down gate line 123 to be adjacent to each other in the extension direction of the data line. That is, the first subpixel electrode 191h and the second subpixel electrode 191l are separated from each other while the trench V1 is interposed therebetween, the first subpixel electrode 191h is positioned in the first subpixel PXa, and the second subpixel electrode 191l is positioned in the second subpixel PXb.

The first subpixel electrode 191h and the second subpixel electrode 191l are connected through the first contact hole 185h and the second contact hole 185l to the first drain electrode 175h and the second drain electrode 175l, respectively. Accordingly, when the first thin film transistor Qh and the second thin film transistor Ql are in an on-state, a data voltage is received from the first drain electrode 175h and the second drain electrode 175l.

An entire shape of each of the first subpixel electrode 191h and the second subpixel electrode 191l is a quadrangle, and the first subpixel electrode 191h and the second subpixel electrode 191l include cross-shaped stem portions formed from horizontal stem portions 193h and 193l and vertical stem portions 192h and 192l crossing the horizontal stem portions 193h and 193l. Further, the first subpixel electrode 191h and the second subpixel electrode 191l include a plurality of fine branch portions 194h and 194l, and protrusion portions 197h and 197l that protrude downwardly or upwardly from edge sides of the subpixel electrodes 191h and 191l.

The pixel electrode 191 is divided into four subregions by the horizontal stem portions 193h and 193l and the vertical stem portions 192h and 192l. The fine branch portions 194h and 194l obliquely extend from the horizontal stem portions 193h and 193l and the vertical stem portions 192h and 192l, and the extension direction thereof may form an angle of approximately 45 degrees (°) or approximately 135° with the gate line 121 or the horizontal stem portions 193h and 193l. Further, the extension directions of the fine branch portions 194h and 194l of the two adjacent subregions may be orthogonal to each other.

In an exemplary embodiment, the first subpixel electrode 191h further includes an outskirt stem portion surrounding an outskirt thereof, and the second subpixel electrode 191l further includes horizontal portions positioned at an upper end and a lower end, and further includes left and right vertical portions 198 positioned at the left and the right of the first subpixel electrode 191h. The left and right vertical portions 198 may prevent capacitive bonding, also referred to as coupling, between the data line 171 and the first subpixel electrode 191h.

The aforementioned exemplary embodiment of the pixels PX, the structure of the thin film transistor, and the shape of the pixel electrode are just an example, is not limited thereto, and various modifications are feasible.

In an exemplary embodiment, a second insulating layer 250 is positioned (or disposed) on the pixel electrode 191, and a common electrode 270 is positioned to be spaced apart from the pixel electrode 191 by a predetermined distance. A microcavity 305 is formed between the pixel electrode 191 and the common electrode 270. The microcavity 305 is surrounded by the pixel electrode 191 and the common electrode 270, and is sorted for each one pixel. In an aspect of the exemplary embodiment, a width and an area of the microcavity 305 may be variously changed according to a size and a resolution of the display device.

In an exemplary embodiment, the common electrode 270 may be formed of a transparent metal material such as indium-tin oxide ("ITO") and/or indium-zinc oxide ("IZO") or the like. A predetermined voltage may be applied to the common electrode 270, and an electric field may be formed between the pixel electrode 191 and the common electrode 270.

A first alignment layer 11 is formed on the second insulating layer 250. A second alignment layer 21 is formed beneath the common electrode 270 to face the first alignment layer 11.

In an exemplary embodiment, the first alignment layer 11 and the second alignment layer 21 may include a main chain and a plurality of side chains connected to the main chain, and the main chain may be formed of an aligning material such as polyamic acid, polysiloxane, and/or polyimide or the like.

The plurality of side chains may include a vertical manifestation group and a pre-tilt angle manifestation group 25.

Herein, the pre-tilt angle manifestation group 25 is a structure for manifesting a pre-tilt angle of liquid crystal molecules, and is formed in a structure protruding from surfaces of the first alignment layer 11 and the second alignment layer 21.

In an exemplary embodiment, the pre-tilt angle manifestation group 25 may be a compound represented by the following Chemical Formula:

[Chemical Formula 1]

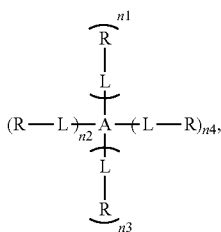

where, L is each independently a single bond, an alkylene group, or an ester group, R is each independently an alkenyl group or a vinyl group, A is a trivalent or tetravalent aliphatic organic group or alicyclic organic group, a sum of n1 to n4 is 3 or 4, and n1 to n4 are each 0 or 1.

Chemical Formula 1 may be represented by the following Chemical Formulas 1-1 to 1-3:

[Chemical Formula 1-1]

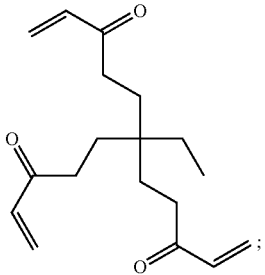

[Chemical Formula 1-2]

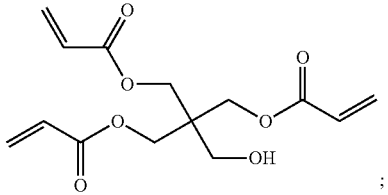
; and

[Chemical Formula 1-3]

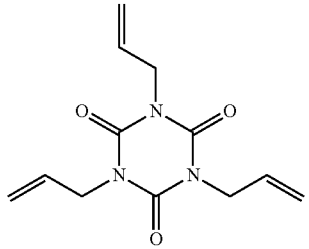

In an exemplary embodiment, in the display device, in order to form the pre-tilt angle of the liquid crystal molecules, the alignment layer where a polymerized reactive mesogen is formed at a portion adjacent to the alignment layer through exposure to an electric field by mixing the reactive mesogen with a liquid crystal composition or the reactive mesogen is included as the side chain is used.

In another exemplary embodiment the pre-tilt manifestation group 25 is formed by the compound represented by Chemical Formula 1, and the pre-tilt angle of the liquid crystal molecules may be formed without the reactive mesogen.

In casein exemplary embodiment of the pre-tilt angle manifestation group 25, a photoreaction group represented by a compound of the following Chemical Formula 2 may be used in the polymerization reaction of the compound represented by Chemical Formula 1:

[Chemical Formula 2]

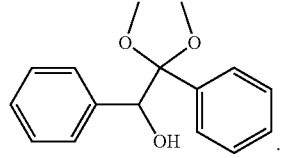

The photoreaction group represented by the compound of Chemical Formula 2 is a functional group where a photopolymerization (or a photodimerization) reaction or a photoisomerization reaction directly occurs by radiating light such as ultraviolet rays, promotes the polymerization reaction between the compounds represented by Chemical Formula 1, and increases the degree of crosslinking of polymerization.

In an exemplary embodiment, the photoreaction group may further include at least one an azo-based functional group, a cinnamate-based functional group, a chalcone-based functional group, a coumarin-based functional group, a maleimide-based functional group, a stilbene-based functional group, and the like, or a combination comprising at least one of the foregoing.

In another exemplary embodiment, the pre-tilt angle manifestation group 25 may further include a polymerization reaction group represented by the compound of the following Chemical Formula 3:

[Chemical Formula 3]

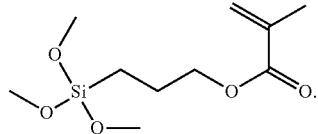

In an exemplary embodiment, the polymerization reaction group is involved in the polymerization reaction of the compound represented by Chemical Formula 1 where the polymerization reaction with the main chains of the alignment layers 11 and 21 is initiated, and the polymerization reaction group may become an acrylate group or a methacrylate group in addition to the compound represented by Chemical Formula 3, but is not limited thereto. In another exemplary embodiment, the first and second alignment layers 11 and 21 may be connected to each other at an edge of the pixel region PX.

A liquid crystal layer formed of liquid crystal molecules 310 is formed in the microcavity 305 positioned between the pixel electrode 191 and the common electrode 270. The liquid crystal molecules 310 have negative dielectric anisotropicity, and are disposed while forming a predetermined pre-tilt angle in a direction that is substantially vertical to the substrate 110. In an exemplary embodiment, the pre-tilt angle may be about 85 degrees (°) to about 89° but is not limited thereto.

Further, in an exemplary embodiment of the liquid crystal layer, in addition to the liquid crystal molecules 310, a compound 311 represented by Chemical Formulas 1 to 3 capable of forming the pre-tilt angle manifestation group 25 may remain in the liquid crystal layer. However, in an exemplary embodiment, all of the compound 311 represented by Chemical Formula 1 forms the pre-tilt angle manifestation group 25, and the remaining compound 311 may not be present in the liquid crystal layer, or may only be present in insubstantial amounts.

The first subpixel electrode 191h and the second subpixel electrode 191l to which the data voltage is applied generate an electric field together with the common electrode 270 to determine a direction of the liquid crystal molecules 310 positioned in the microcavity 305 between the two electrodes 191 and 270. Luminance of light passing through the liquid crystal layer is changed according to the thus determined direction of the liquid crystal molecules 310.

A third insulating layer 340 is further positioned on the common electrode 270. The third insulating layer 340 may be formed from an inorganic insulating material such as silicon nitride (SiNx), silicon oxide (SiOx), and/or silicon oxynitride (SiOxNy), or the like and may be omitted if necessary.

The roof layer 360 is positioned on the third insulating layer 340, and the roof layer 360 may be formed from an organic material. In an exemplary embodiment, the microcavity 305 is formed beneath the roof layer 360, and the roof layer 360 may be hardened by a curing process to maintain a shape of the microcavity 305. The roof layer 360 is formed to be spaced apart from the pixel electrode 191 while the microcavity 305 is interposed between the roof layer 360 and the pixel electrode 191.

The roof layer 360 is formed in the extension direction of the data line in each pixel PX and the partition wall V2 in one pixel, but is not formed in the trench V1. That is, the roof layer 360 is not formed between the first subpixel PXa and the second subpixel PXb. In each first subpixel PXa and second subpixel PXb, the microcavity 305 is formed beneath each roof layer 360. In an exemplary embodiment, the roof layers 360 corresponding to the microcavity 360 may be connected at a portion overlapping the data line 171 to form the partition wall V2, and the partition wall V2 may serve to compart the microcavity 360. Therefore, the thickness of the roof layer 360 positioned in the partition wall V2 may be larger than the thickness of the roof layer 360 positioned in each first subpixel PXa and second subpixel PXb. An upper surface and both lateral surfaces of the microcavity 305 are covered by the roof layer 360.

In the common electrode 270, the third insulating layer 340, and the roof layer 360, an entrance portion 307 through which a portion of the microcavity 305 is exposed is formed. In an exemplary embodiment, the entrance portions 307 may be formed to face each other at edges of the first subpixel PXa and the second subpixel PXb. That is, the entrance portion 307 may be formed to correspond to a lower side of the first subpixel PXa and an upper side of the second subpixel PXb and thus expose a lateral surface of the microcavity 305. Since the microcavity 305 is exposed by the entrance portion 307, an aligning agent, a liquid crystal material, or the like may be injected through the entrance portion 307 into the microcavity 305.

The overcoat 390 is positioned on the roof layer 360. The overcoat 390 covers the entrance portion 307 through which a portion of the microcavity 305 is exposed to the outside. The overcoat 390 encapsulates the microcavity 305 so that the liquid crystal molecules 310 positioned in the microcavity 305 are not discharged to the outside.

The overcoat 390 may be formed of an organic layer, and may include the compound represented by the following Chemical Formula 1:

[Chemical Formula 1]

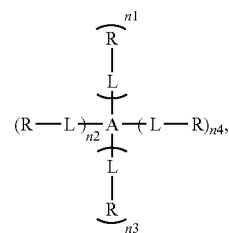

where L is each independently a single bond, an alkylene group, or an ester group, R is each independently an alkenyl group or a vinyl group, A is a trivalent or tetravalent aliphatic organic group or alicyclic organic group, a sum of n1 to n4 is 3 or 4, and n1 to n4 are each 0 or 1.

Chemical Formula 1 may be represented by the following Chemical Formulas 1-1 to 1-3:

[Chemical Formula 1-1]

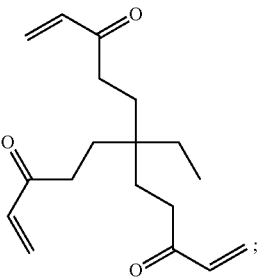

[Chemical Formula 1-2]

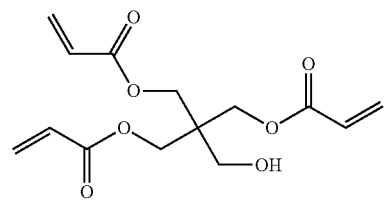

; and

[Chemical Formula 1-3]

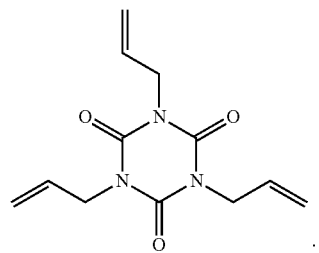

In an exemplary embodiment, in the display device, in order to form the pre-tilt angle of the liquid crystal molecules, the alignment layer where a polymerized reactive mesogen is formed at a portion adjacent to the alignment layer through exposure to an electric field by mixing the reactive mesogen with a liquid crystal composition or the reactive mesogen is included as the side chain is used.

In another exemplary embodiment, when the overcoat 390 is formed, since a two-step process is performed in a manner in which the overcoat 390 is pseudo-cured and then main-cured, the compound represented by Chemical Formula 1 may be mixed and added into the liquid crystal layer, and since the compound represented by Chemical Formula 1 may perform a role that is similar to that of the reactive mesogen, the pre-tilt angle of the liquid crystal molecules may be formed without the reactive mesogen.

In an exemplary embodiment, the overcoat 390 may further include a photoreaction group represented by the compound of the following Chemical Formula 2 used in the polymerization reaction of the compound represented by Chemical Formula 1:

[Chemical Formula 2]

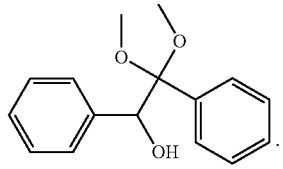

The photoreaction group represented by the compound of Chemical Formula 2 is a functional group where a photopolymerization (photodimerization) reaction or a photoisomerization reaction directly occurs by radiating light such as ultraviolet rays, and may promote the polymerization reaction between the compounds represented by Chemical Formula 1, and may increase the degree of crosslinking of polymerization.

In an exemplary embodiment, the photoreaction group the photoreaction group may include at least one of an azo-based functional group, a cinnamate-based functional group, a chalcone-based functional group, a coumarin-based functional group, a maleimide-based functional group and/or a stilbene-based functional group, or the like, or a composition comprising at least one of the foregoing.

In another exemplary embodiment, the overcoat 390 may further include a polymerization reaction group represented by the compound of the following Chemical Formula 3:

[Chemical Formula 3]

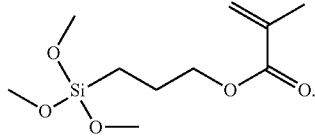

The polymerization reaction group is involved in the polymerization reaction of the compound represented by Chemical Formula 1 where the polymerization reaction with the main chains of the alignment layers 11 and 21 is initiated, and the polymerization reaction group may become an acrylate group or a methacrylate group in addition to the compound represented by Chemical Formula 3 but is not limited thereto.

In an exemplary embodiment, the overcoat 390 may be formed to cover an entire surface of the substrate 110.

Although not shown in the drawings, a polarizing plate may be further formed on upper and lower surfaces of the display device. The polarizing plate may be formed of a first polarizing plate and a second polarizing plate. The first polarizing plate may be attached to a lower surface of the substrate 110, and the second polarizing plate may be attached onto the overcoat 390.

Hereinafter, an exemplary embodiment of a method of manufacturing a display device will be described in detail with reference to FIGS. 4 to 15.

FIGS. 4, 6, 8 10 and FIGS. 12 to 14 are cross-sectional views taken along line II-II of FIG. 1 according to an exemplary embodiment of a manufacturing process. FIGS. 5, 7, 9, 11 and 15 are cross-sectional views taken along line of FIG. 1 according to an exemplary embodiment of a manufacturing process.

Figure 4:
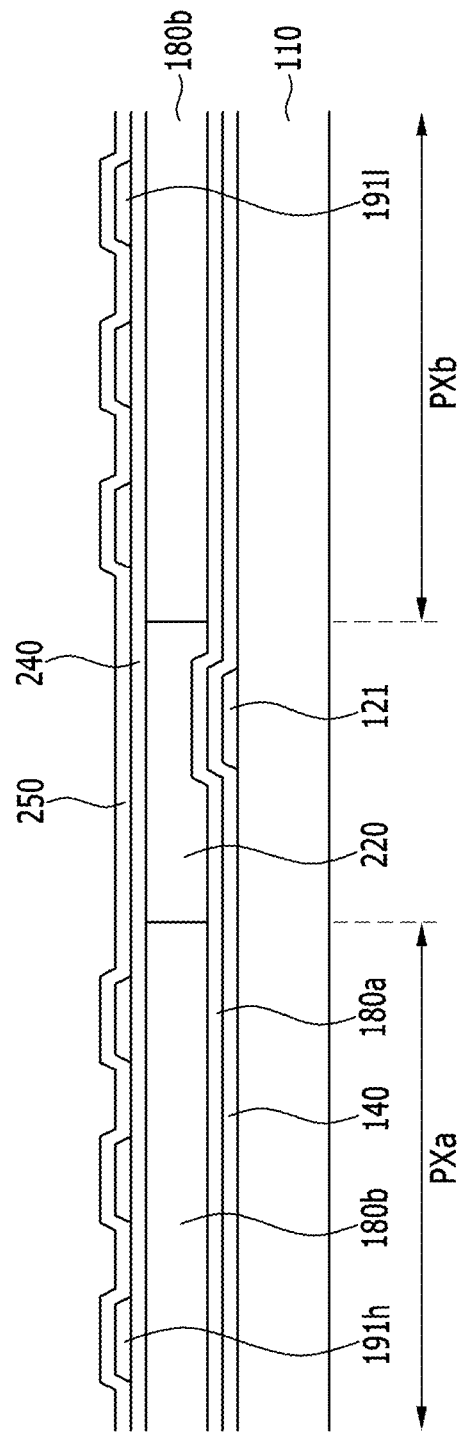
FIGS. 4, 6, 8,10 and FIGS. 12 to 14 are cross-sectional views taken along line II-II of FIG. 1 according to an exemplary embodiment of a manufacturing process.
Figure 5:
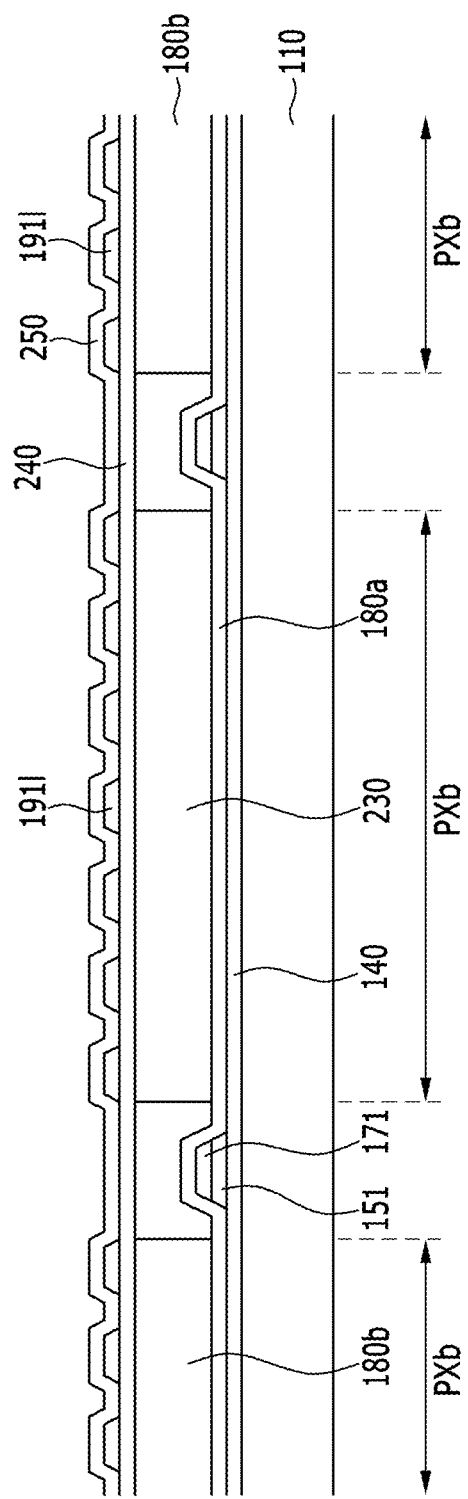
FIGS. 5, 7, 9, 11 and 15 are cross-sectional views taken along line of FIG. 1 according to an exemplary embodiment of a manufacturing process.

First, as illustrated in FIGS. 4 and 5, on a substrate 110 formed of glass, plastic, or the like, a gate line 121 and a step-down gate line 123 extending in one direction are formed, and a first gate electrode 124h, a second gate electrode 124l, and a third gate electrode 124c protruding from the gate line 121 are formed.

In an exemplary embodiment, a storage electrode line 131 may be formed together to be spaced apart from the gate line 121, the step-down gate line 123, and the first to third gate electrodes 124h, 124l, and 124c.

Subsequently, a gate insulating layer 140 is formed on an entire surface of the substrate 110 including the gate line 121, the step-down gate line 123, the first to third gate electrodes 124h, 124l, and 124c, and the storage electrode line 131 by using an inorganic insulating material such as silicon oxide (SiOx) or silicon nitride (SiNx). In an exemplary embodiment, the gate insulating layer 140 may be formed of a single layer or a multilayer.

Subsequently, a semiconductor material such as amorphous silicon, polycrystalline silicon, and/or metal oxide or the like is deposited on the gate insulating layer 140, and then patterned to form a first semiconductor layer 154h, a second semiconductor layer 154l, and a third semiconductor layer 154c. In an exemplary embodiment, the first semiconductor layer 154h may be positioned on the first gate electrode 124h, the second semiconductor layer 154l may be positioned on the second gate electrode 124l, and the third semiconductor layer 154c may be positioned on the third gate electrode 124c.

Subsequently, a data line 171 extending in another direction is formed by depositing a metal material and then patterning the metal material. The metal material may be formed of a single layer or a multilayer.

Further, a first source electrode 173h protruding from the data line 171 over the first gate electrode 124h, and a first drain electrode 175h spaced apart from the first source electrode 173h are formed together. A second source electrode 173l connected to the first source electrode 173h, and a second drain electrode 175l spaced apart from the second source electrode 173l are formed together. A third source electrode 173c extending from the second drain electrode 175l, and a third drain electrode 175c spaced apart from the third source electrode 173c are formed together.

In an exemplary embodiment, the first to third semiconductor layers 154h, 154l, and 154c, the data line 171, the first to third source electrodes 173h, 173l, and 173c, and the first to third drain electrodes 175h, 175l, and 175c may be formed by continuously depositing a semiconductor material and a metal material and then simultaneously patterning the materials. In casein aspect of the exemplary embodiment, the first semiconductor layer 154h is formed to extend below the data line 171.

The first, second, and third gate electrodes 124h, 124l, and 124c, the first, second, and third source electrodes 173h, 173l, and 173c, and the first, second, and third drain electrodes 175h, 175l, and 175c, constitute first, second, and third thin film transistors ("TFT") Qh, Ql, and Qc, respectively, together with the first, second, and third semiconductor layers 154h, 154l, and 154c.

Subsequently, a first passivation layer 180a is formed on the semiconductor layers 154h, 154l, and 154c exposed between the data line 171, the first to third source electrodes 173h, 173l, and 173c, the first to third drain electrodes 175h, 175l, and 175c, each of the source electrodes 173h, 173l, and 173c, and each of the drain electrodes 175h, 175l, and 175c. In an exemplary embodiment, the first passivation layer 180a may be formed from an organic insulating material or an inorganic insulating material or the like, and formed of a single layer or a multilayer.

Subsequently, a second passivation layer 180b positioned in each pixel PX on the first passivation layer 180a is formed. In an exemplary embodiment, the second passivation layer 180b may be formed in each first subpixel PXa and second subpixel PXb, but may not be formed in the trench V1.

In an exemplary embodiment, the second passivation layer 180b may be formed from a color filter.

Subsequently, a light blocking member 220 is formed on a boundary portion of each pixel PX on the first passivation layer 180a and a thin film transistor. In an exemplary embodiment, the light blocking member 220 may be formed in the trench V1 positioned between the first subpixel PXa and the second subpixel PXb.

In the above exemplary embodiment, it is described that after the second passivation layer 180b is formed, the light blocking member 220 is formed, but the present invention is not limited thereto. In another exemplary embodiment, after the light blocking member 220 is first formed, the second passivation layer 180b may be formed.

Subsequently, a first insulating layer 240 is formed of an inorganic insulating material such as silicon nitride (SiNx), silicon oxide (SiOx), and/or silicon oxynitride (SiOxNy) or the like on the second passivation layer 180b and the light blocking member 220.

Subsequently, a first contact hole 185h is formed to expose a portion of the first drain electrode 175h and a second contact hole 185l is formed to expose a portion of the second drain electrode 175l by etching the first passivation layer 180a, the light blocking member 220, and the first insulating layer 240.

Subsequently, on the first insulating layer 240, a transparent metal material such as indium-tin oxide ("ITO") and indium-zinc oxide ("IZO") is deposited and then patterned to form a first subpixel electrode 191h in the first subpixel PXa and form a second subpixel electrode 191l in the second subpixel PXb. The first subpixel electrode 191h and the second subpixel electrode 191l are separated from each other while a first valley V1 is interposed therebetween. The first subpixel electrode 191h is formed to be connected through the first contact hole 185h to the first drain electrode 175h, and the second subpixel electrode 191l is formed to be connected through the second contact hole 185l to the second drain electrode 175l.

Horizontal stem portions 193h and 193l, and vertical stem portions 192h and 192l crossing the horizontal stem portions 193h and 193l are formed in the first subpixel electrode 191h and the second subpixel electrode 191l. Further, a plurality of fine branch portions 194h and 194l obliquely extending from the horizontal stem portions 193h and 193l and the vertical stem portions 192h and 192l are formed.

Next, a second insulating layer 250 is formed on a pixel electrode 191 and a first insulating layer 240.

Figure 6:
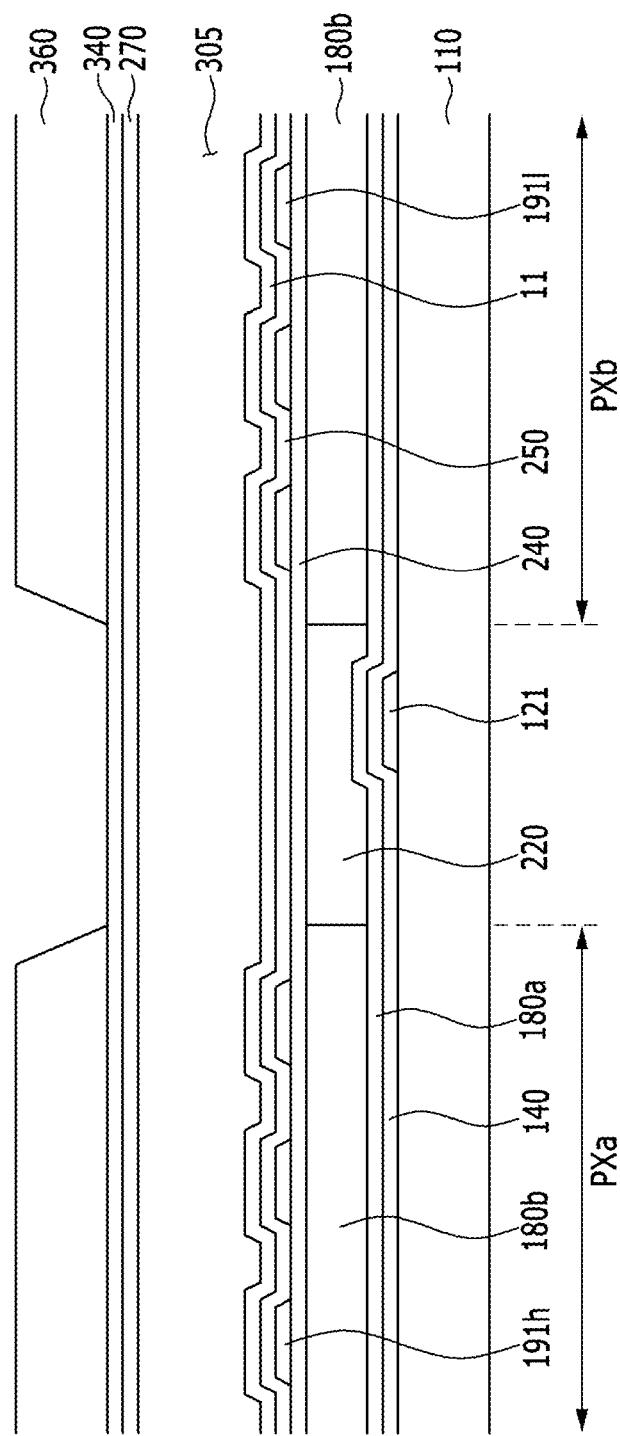
Figure 7:
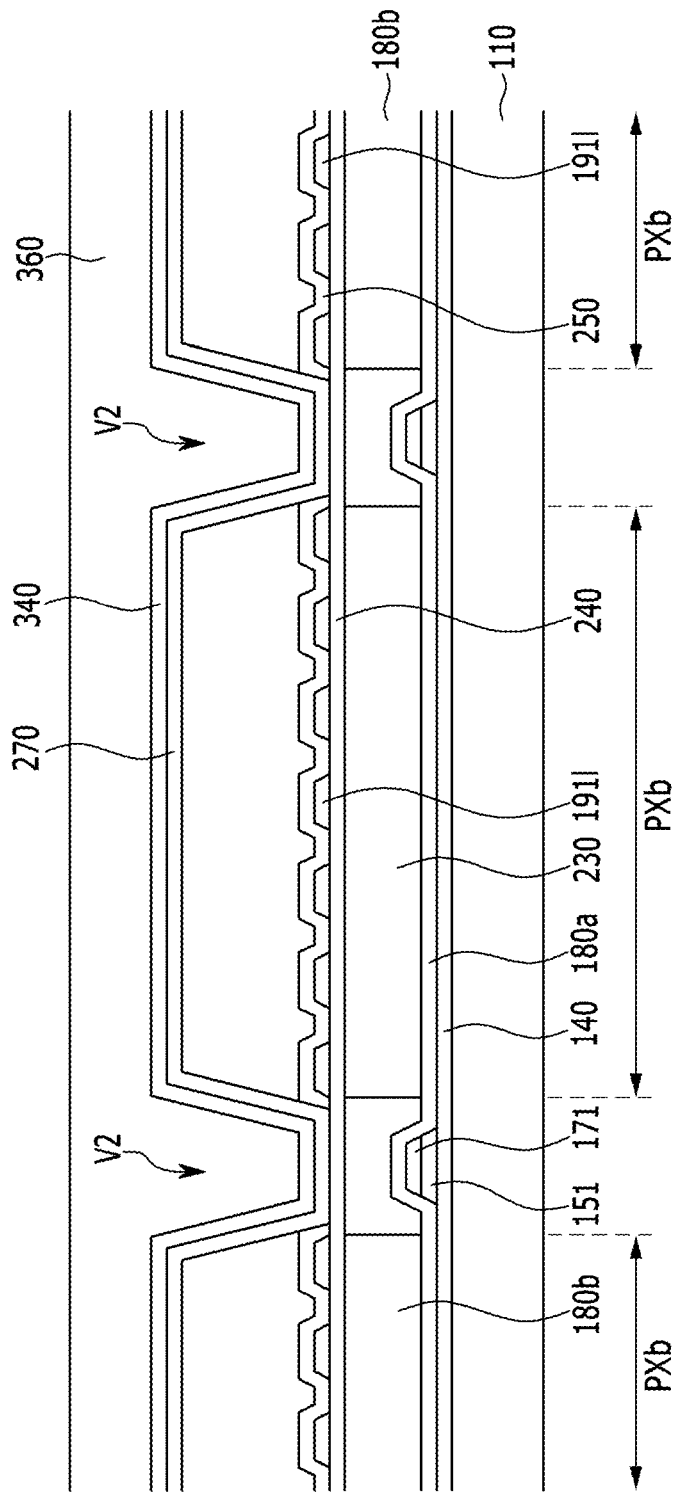

As illustrated in FIGS. 6 to 7, a photosensitive organic material is applied on the second insulating layer 250, and a sacrificial layer 300 is formed through a photoprocess.

The sacrificial layers 300 are formed to be connected along a plurality of pixel columns. That is, the sacrificial layer 300 is formed to cover each pixel PX, and is formed to cover a trench V1 positioned between the first subpixel PXa and the second subpixel PXb.

Subsequently, a transparent metal material such as indium-tin oxide ("ITO") and indium-zinc oxide ("IZO") is deposited on the sacrificial layer 300 to form a common electrode 270.

Subsequently, in an exemplary embodiment, a third insulating layer 340 may be formed of an inorganic insulating material such as silicon nitride (SiNx), silicon oxide (SiOx), and silicon oxynitride (SiOxNy) or the like on the common electrode 270.

Subsequently, a roof layer 360 is formed by applying the organic material on the third insulating layer 340 and performing patterning. In casein exemplary embodiment, patterning may be performed to remove the organic material positioned in the trench V1. Accordingly, the roof layer 360 is formed to be connected along a plurality of pixel rows.

In an exemplary embodiment, the roof layer 360 is formed not to be positioned in a region of the trench V1, and is spaced apart from the region of the trench V1 while the valley region is interposed therebetween. Accordingly, the roof layer of a region adjacent to the valley region is inclined, and is formed to have an inclination surface.

Figure 8:
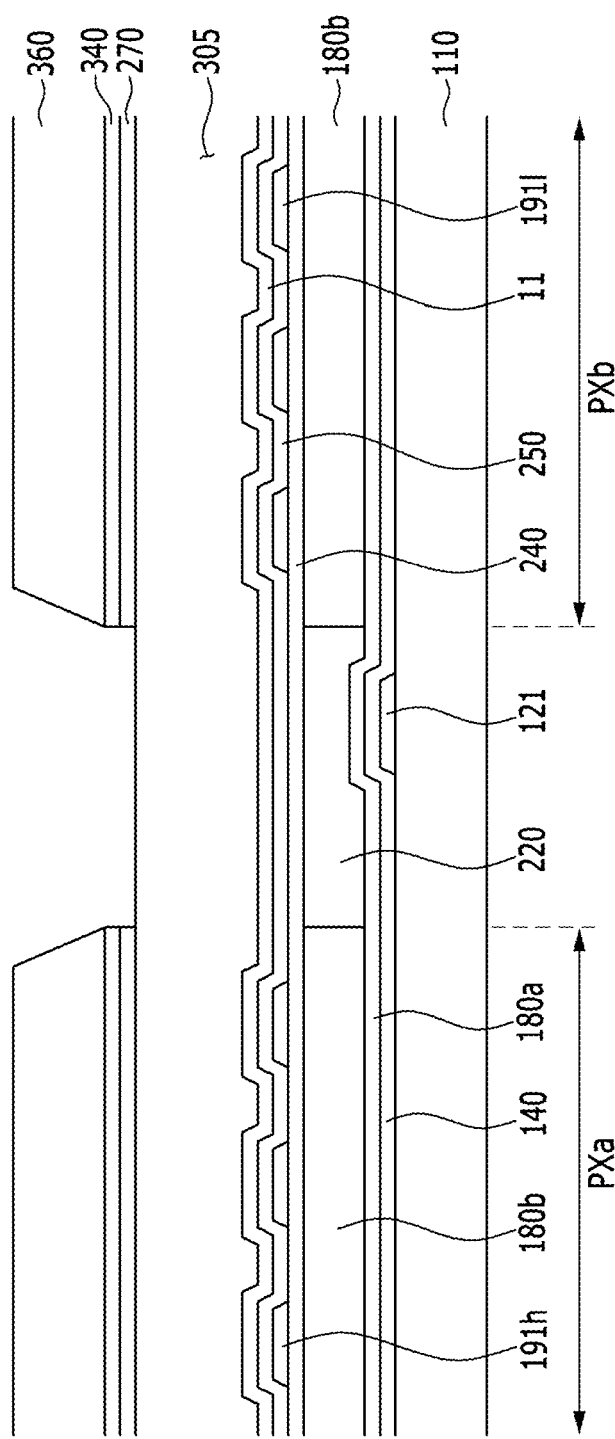
Figure 9:
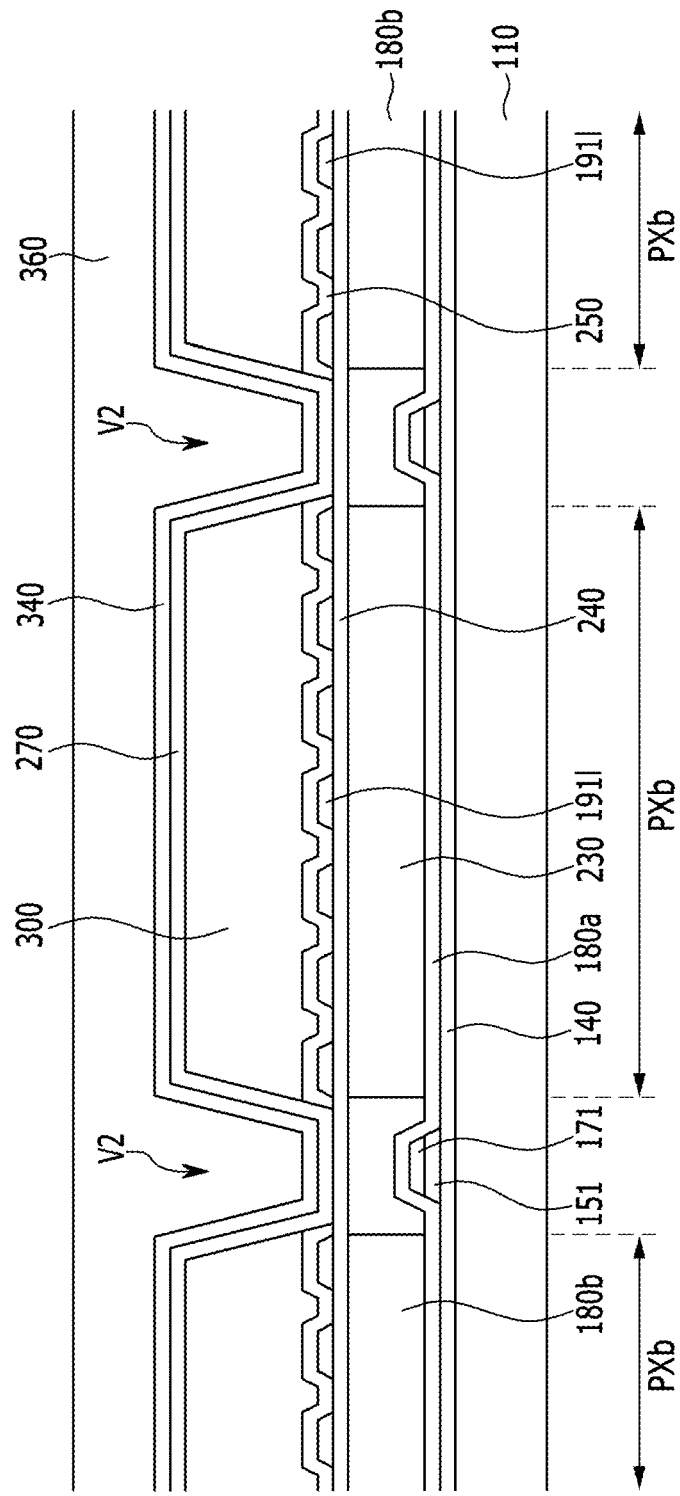

Next, as illustrated in FIGS. 8 to 9, the third insulating layer 340 and the common electrode 270 are patterned by using the roof layer 360 as a mask. First, after the third insulating layer 340 is dry-etched by using the roof layer 360 as the mask, the common electrode 270 is wet-etched.

Figure 10:
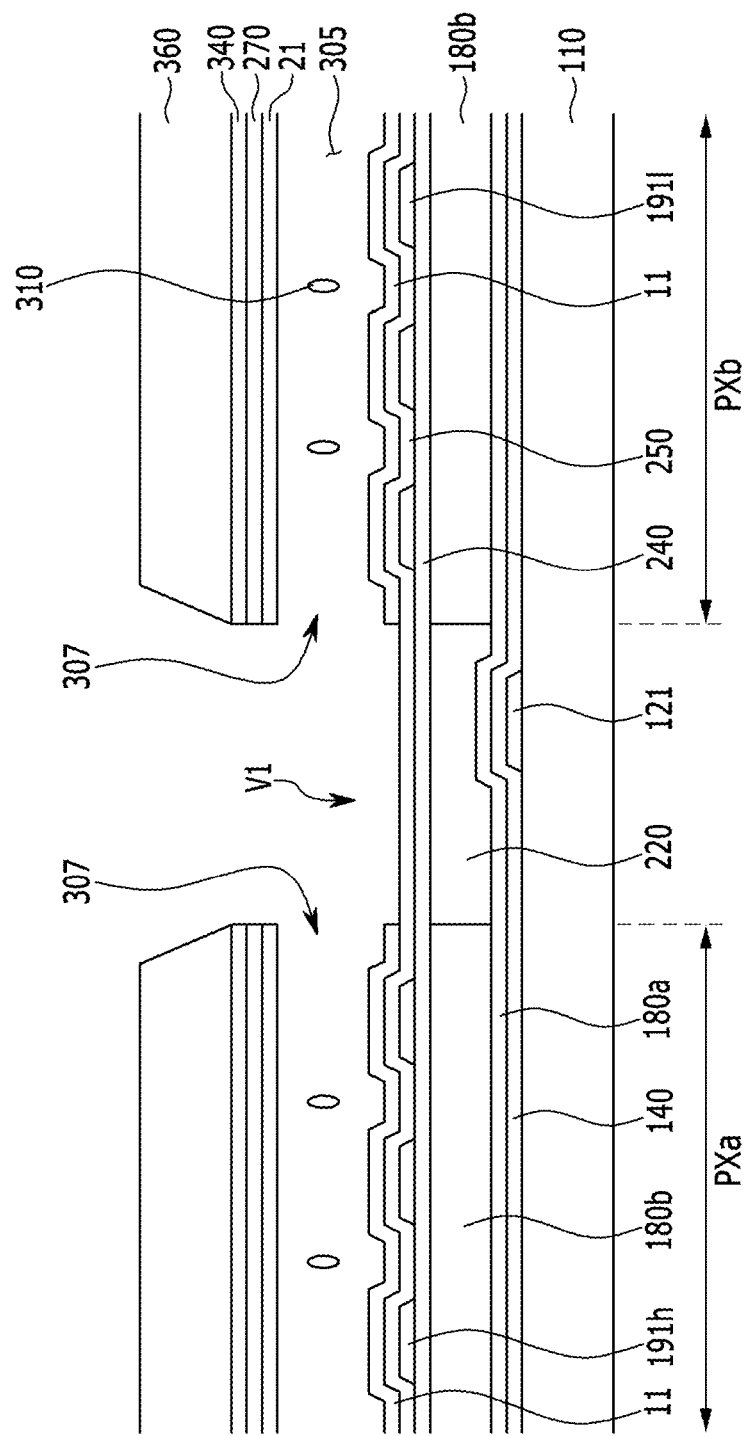
Figure 11:
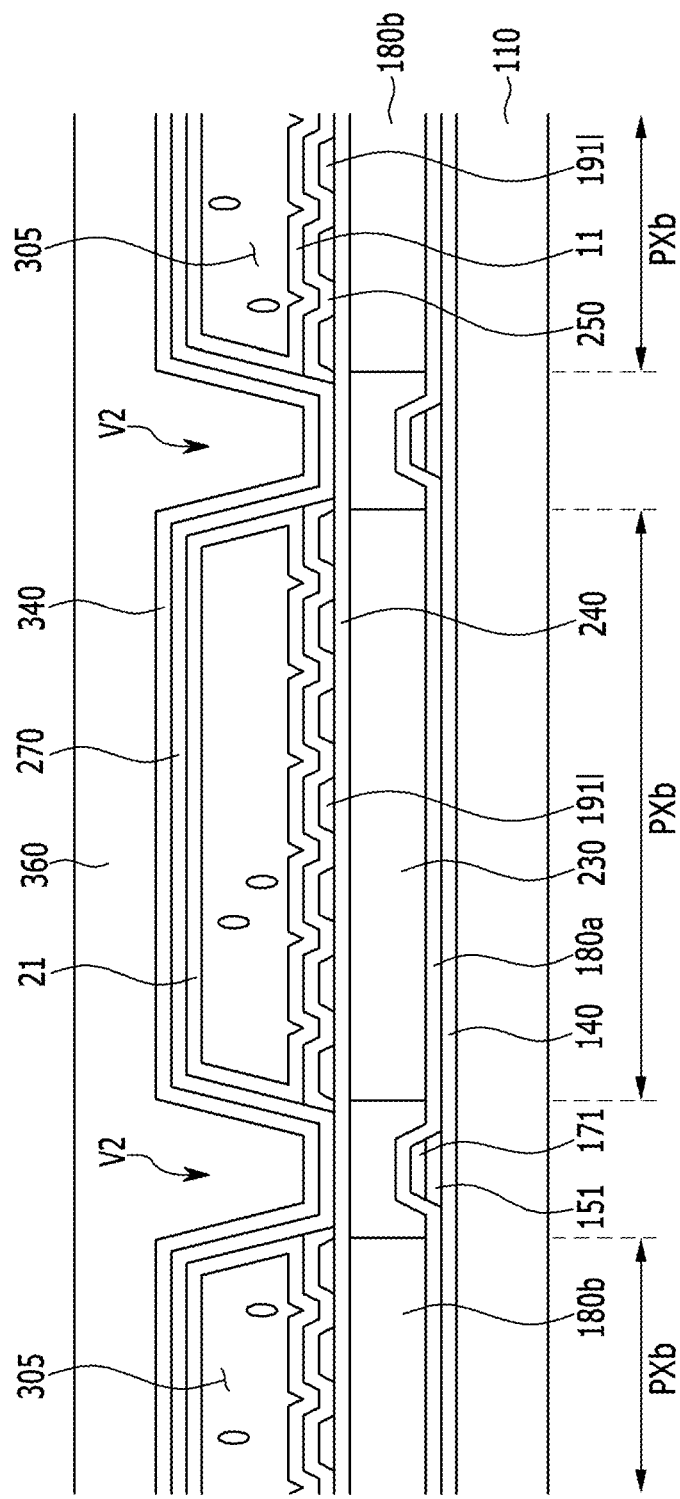

Next, as illustrated in FIGS. 10 to 11, a developing solution, a stripper solution, or the like is supplied on the substrate 110 where the sacrificial layer 300 is exposed to remove an entire surface of the sacrificial layer 300 or remove the entire surface of the sacrificial layer 300 by using an ashing process.

If the sacrificial layer 300 is removed, the microcavity 305 is formed at a position in which the sacrificial layer 300 was positioned.

The pixel electrode 191 and the common electrode 270 are spaced apart from each other while the microcavity 305 is interposed therebetween, and the pixel electrode 191 and the roof layer 360 are spaced apart from each other while the microcavity 305 is interposed therebetween. The common electrode 270 and the roof layer 360 are formed to cover an upper surface and both lateral surfaces of the microcavity 305.

The microcavity 305 is exposed to the outside through a portion in which the roof layer 360, the third insulating layer 340, and the common electrode 270 are removed, and this is called an entrance portion 307. The entrance portion 307 is formed along the trench V1. In an exemplary embodiment, the entrance portions 307 may be formed to face each other at edges of the first subpixel PXa and the second subpixel PXb. That is, the entrance portion 307 may be formed to correspond to a lower side of the first subpixel PXa and an upper side of the second subpixel PXb and thus expose a lateral surface of the microcavity 305. In another exemplary embodiment, the entrance portion 307 may be formed along a partition wall V2.

Subsequently, the roof layer 360 is cured by heating the substrate 110. The curing conditions are configured to maintain the shape of the microcavity 305 by the roof layer 360.

Subsequently, in an exemplary embodiment, an aligning agent including an aligning material is dripped on the substrate 110 by a spin coating mode or an inkjet mode, the aligning agent is injected through the entrance portion 307 into the microcavity 305. In another exemplary embodiment, a curing process is performed after the aligning agent is injected into the microcavity 305, a solution component is vaporized, and the aligning material remains on an inner wall surface of the microcavity 305.

Accordingly, in an exemplary embodiment, a first alignment layer 11 may be formed on the pixel electrode 191, and a second alignment layer 21 may be formed beneath the common electrode 270. The first alignment layer 11 and the second alignment layer 21 are formed to face each other with the microcavity 305 interposed therebetween, and are formed to be connected to each other at the edge of the pixel PX.

In an exemplary embodiment, the first and second alignment layers 11 and 21 may be aligned in a direction that is substantially vertical to the insulating substrate 110 with the exception of the lateral surface of the microcavity 305.

Subsequently, in an exemplary embodiment, the liquid crystal material formed of liquid crystal molecules 310 is dripped on the substrate 110 by an inkjet mode or a dispensing mode, and the liquid crystal material is injected through the entrance portion 307 into the micro cavity 305.

Figure 12:
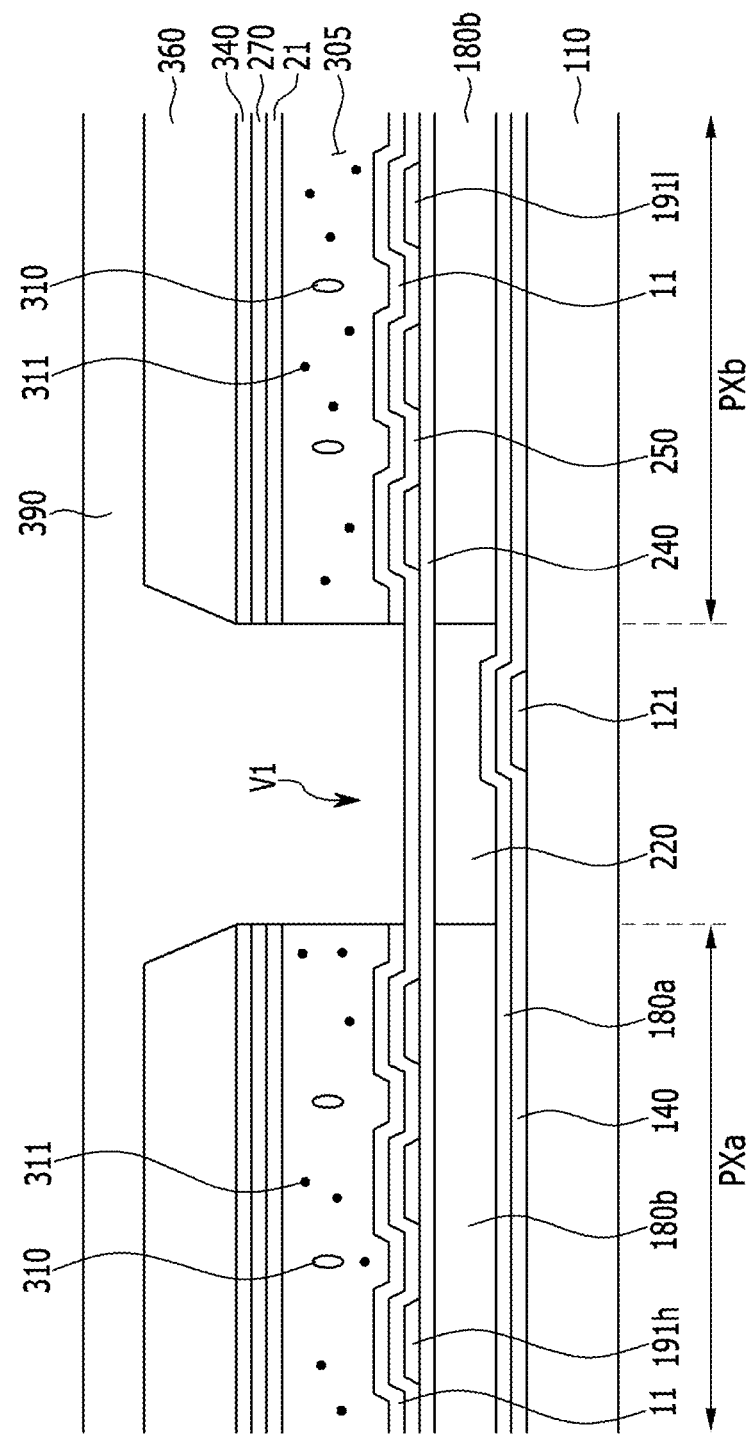
Figure 13:
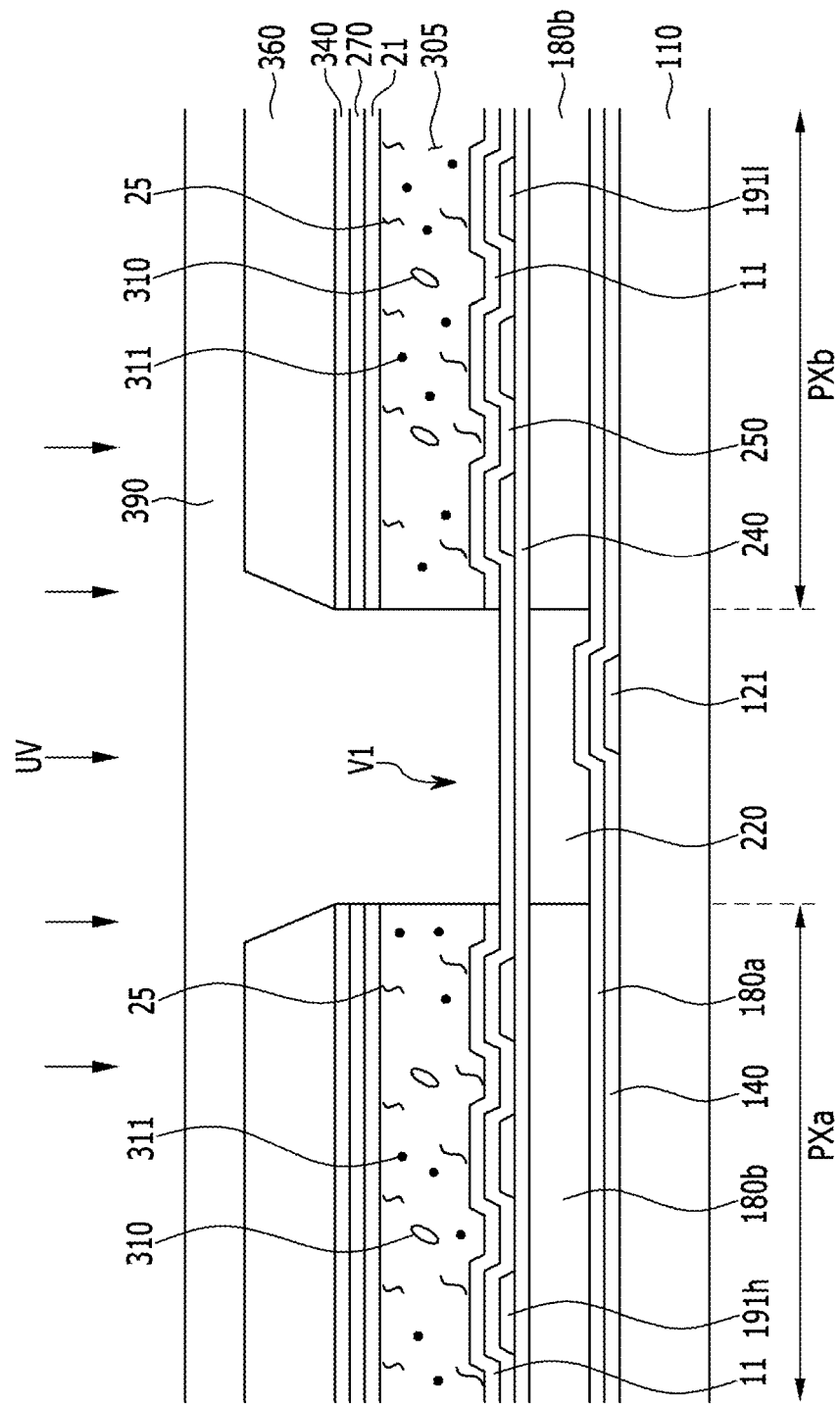

Next, as illustrated in FIGS. 12 to 13, an exemplary embodiment of an overcoat 390 is formed on an entire surface of the substrate 110 by depositing the organic material. The overcoat 390 is formed to cover the entrance portion 307 through which the microcavity 305 is exposed to the outside, and thus encapsulates the microcavity 305.

In an exemplary embodiment, the overcoat 390 may include a compound represented by the following Chemical Formula 1:

[Chemical Formula 1]

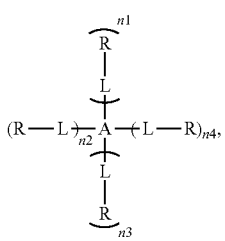

where L is each independently a single bond, an alkylene group, or an ester group, R is each independently an alkenyl group or a vinyl group, A is a trivalent or tetravalent aliphatic organic group or alicyclic organic group, a sum of n1 to n4 is 3 or 4, and n1 to n4 are each 0 or 1.

In an aspect of the exemplary embodiment, Chemical Formula 1 may be represented by the following Chemical Formulas 1-1 to 1-3:

[Chemical Formula 1-1]

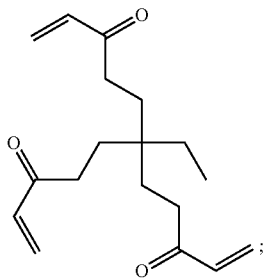

[Chemical Formula 1-2]

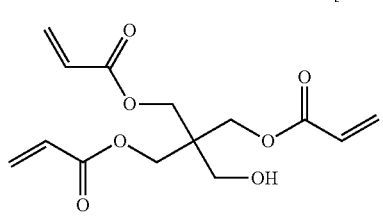

; and

[Chemical Formula 1-3]

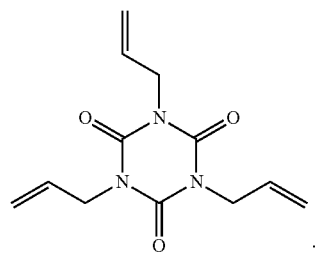

In an exemplary embodiment, the overcoat 390 may further include a photoreaction group represented by a compound of the following Chemical Formula 2:

[Chemical Formula 2]

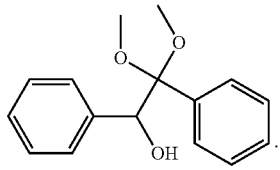

The photoreaction group represented by the compound of Chemical Formula 2 is a functional group where a photopolymerization (photodimerization) reaction or a photoisomerization reaction directly occurs by radiating light such as ultraviolet rays, and may promote a polymerization reaction between the compounds represented by Chemical Formula 1 and may increase the degree of crosslinking of polymerization.

In an exemplary embodiment, the photoreaction group may further include at least one of an azo-based functional group, a cinnamate-based functional group, a chalcone-based functional group, a coumarin-based functional group, a maleimide-based functional group and/or a stilbene-based functional group, or the like or a combination comprising at least one of the foregoing.

In another exemplary embodiment, the overcoat 390 may further include a polymerization reaction group represented by a compound of the following Chemical Formula 3:

[Chemical Formula 3]

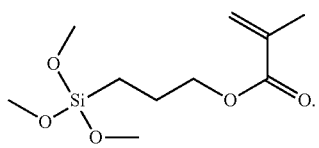

The polymerization reaction group is involved in the polymerization reaction of the compound represented by Chemical Formula 1 where the polymerization reaction with the main chains of the alignment layers 11 and 21 is initiated, and the polymerization reaction group may become an acrylate group or a methacrylate group in addition to the compound represented by Chemical Formula 3, but is not limited thereto.

First, referring to FIG. 12, the overcoat 390 formed from the organic material including the compound represented by Chemical Formulas 1 to 3 is applied on the entire surface of the substrate 110 and then pseudo-cured.

By curing only a portion of the overcoat 390 through the pseudo-curing process instead of completely curing the overcoat 390, a compound 311 represented by Chemical Formula 1 included in the overcoat 390 may be diffused into the liquid crystal layer to be mixed and added. Herein, "pseudo-curing" means a state where the overcoat 390 is cured by about 40 percent (%) to about 80%, and pseudo-curing may be performed through exposure to energy of about 0.5 to 4.0 Joules ( ) J by using ultraviolet ("UV") light or the like.

In an aspect of the exemplary embodiment, when the overcoat 390 is cured by less than 40%, a contamination problem in the liquid crystal layer may occur, and when the overcoat 390 is cured by more than 80%, it may be difficult for the compound 311 represented by Chemical Formula 1 to be diffused into the liquid crystal layer.

In another aspect of the exemplary embodiment, when the exposure to energy is less than 0.5 J, the degree of curing of the overcoat 390 may be low, and when the exposure to energy is more than 4.0 J, the degree of curing of the overcoat 390 may be excessive.

Next, referring to FIG. 13, a data voltage is applied to the pixel electrode 191 of a lower display panel 110, and a common voltage is applied to the common electrode 270 of an upper display panel 210 to generate an electric field in a liquid crystal layer including a liquid crystal molecule 310 between two display panels 110 and 210. Then, in an exemplary embodiment, the liquid crystal molecules 310 may respond to the electric field to be inclined in a direction that is parallel to a length direction of the fine branch portion formed in the pixel electrode 191. In this exemplary embodiment, the total number of inclination directions of the liquid crystal molecules 310 in one pixel may be four.

After the electric field is generated in the liquid crystal molecule 310, if light such as ultraviolet rays is radiated, the compound 311 represented by Chemical Formula 1 and the photoreaction group represented by Chemical Formula 2 are reacted with each other to form an alignment polymer, and the polymer may be polymerized in the alignment layers 11 and 21 to form a pre-tilt angle manifestation group 25, and thus control a pre-tilt angle that is an initial alignment direction of the liquid crystal molecule 310.

Figure 14:
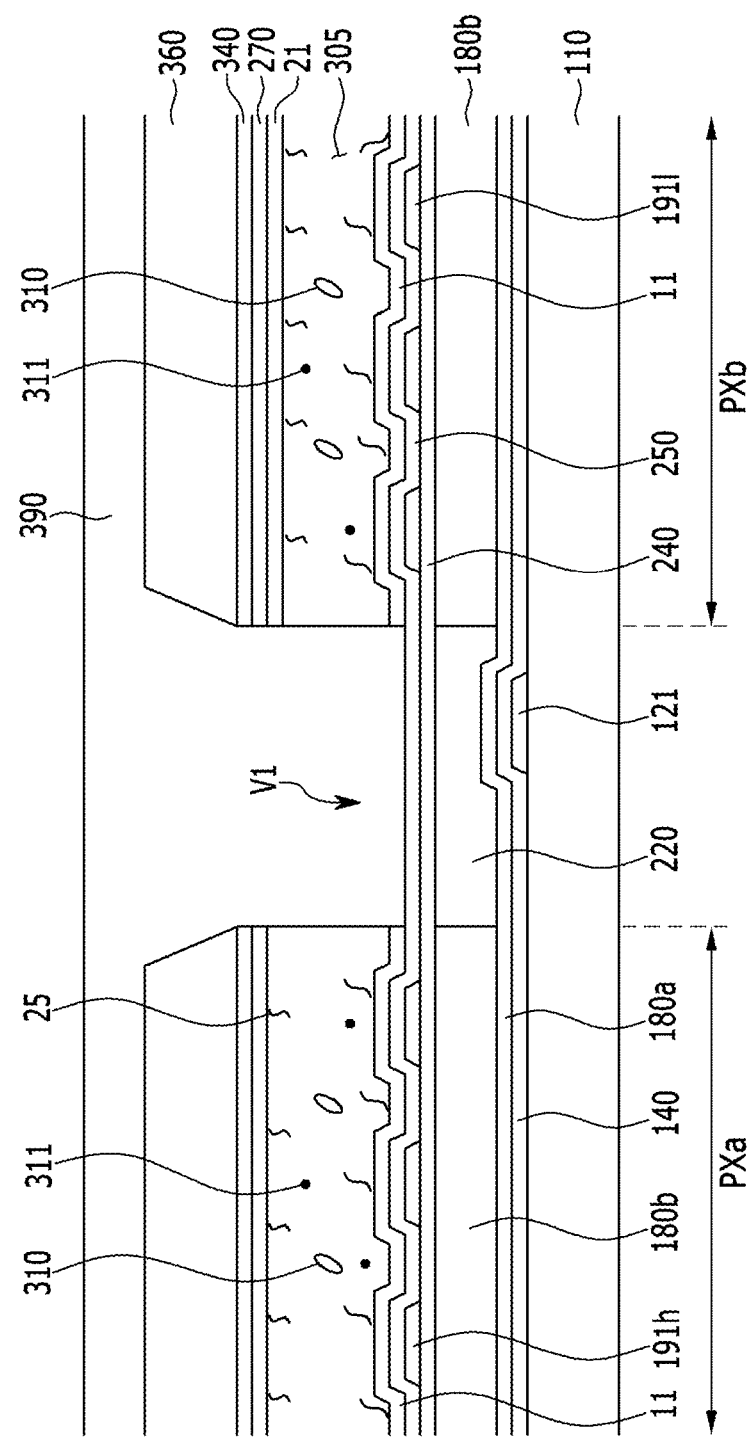
Figure 15:
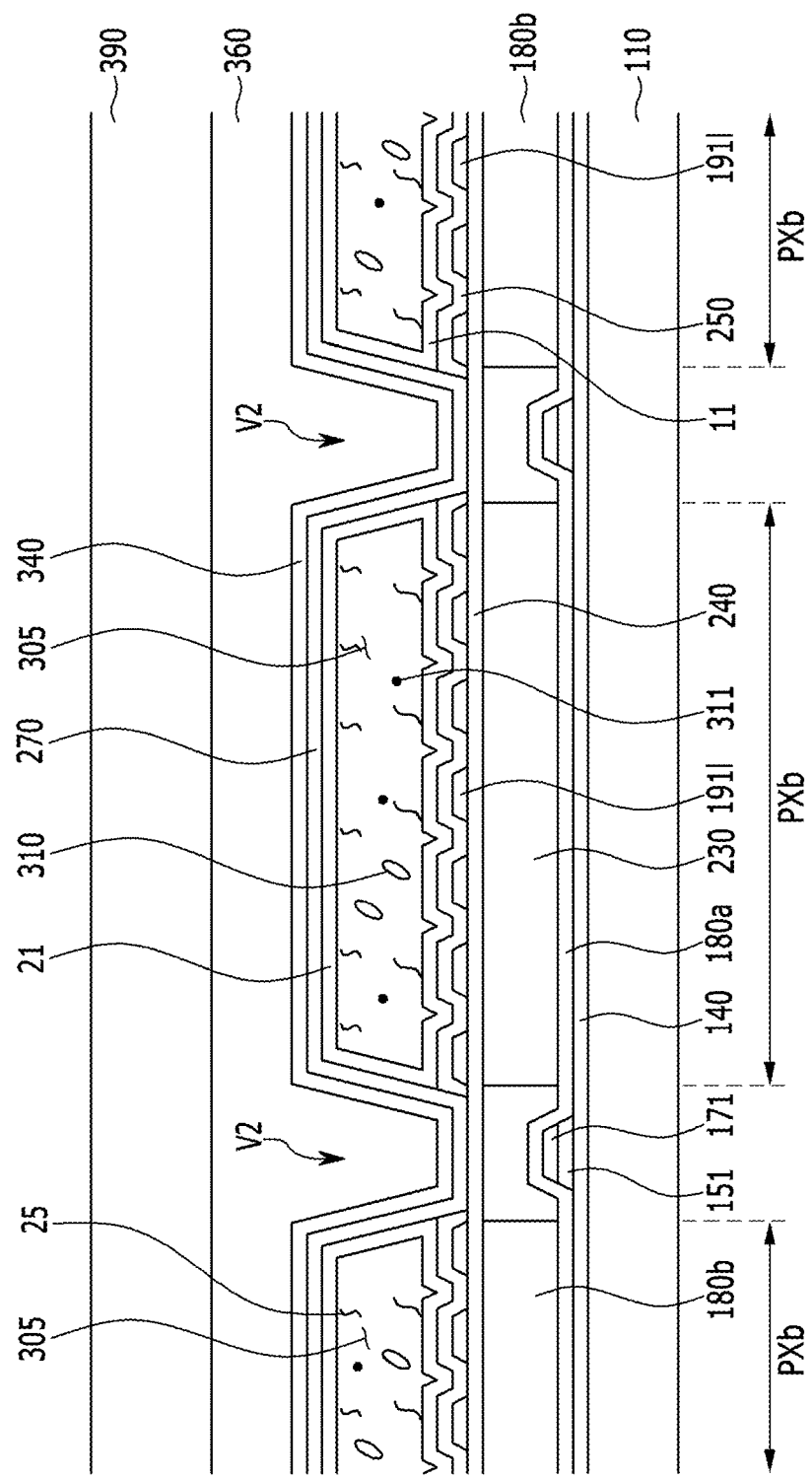

Finally, referring to FIGS. 14 to 15, energy may be additionally radiated on the overcoat 390 by using UV and the like to perform a main-curing step of the overcoat 390 and thus completely cure the overcoat 390 while minimizing the remaining compound 311.

In an exemplary embodiment, in the display device, in order to form the pre-tilt angle of the liquid crystal molecules, the alignment layer where a reactive mesogen is formed in the alignment layer through exposure to an electric field by mixing the reactive mesogen with a liquid crystal composition or the reactive mesogen is included as the side chain is used.

In another exemplary embodiment, when the overcoat 390 is formed, since a two-step process is performed in a manner where the overcoat 390 is pseudo-cured and then complete-cured, the compound 311 represented by Chemical Formula 1 included in the overcoat 390 may be mixed and added into the liquid crystal layer. Since the compound 311 represented by Chemical Formula 1 may perform a role that is similar to that of the reactive mesogen, the pre-tilt angle of the liquid crystal molecules 310 may be formed without the reactive mesogen.

Hereinafter, an experimental result showing that an exemplary embodiment of the compound represented by Chemical Formula 1 is actually diffused into the liquid crystal layer to be mixed will be reviewed with reference to FIG. 16.

Figure 16:
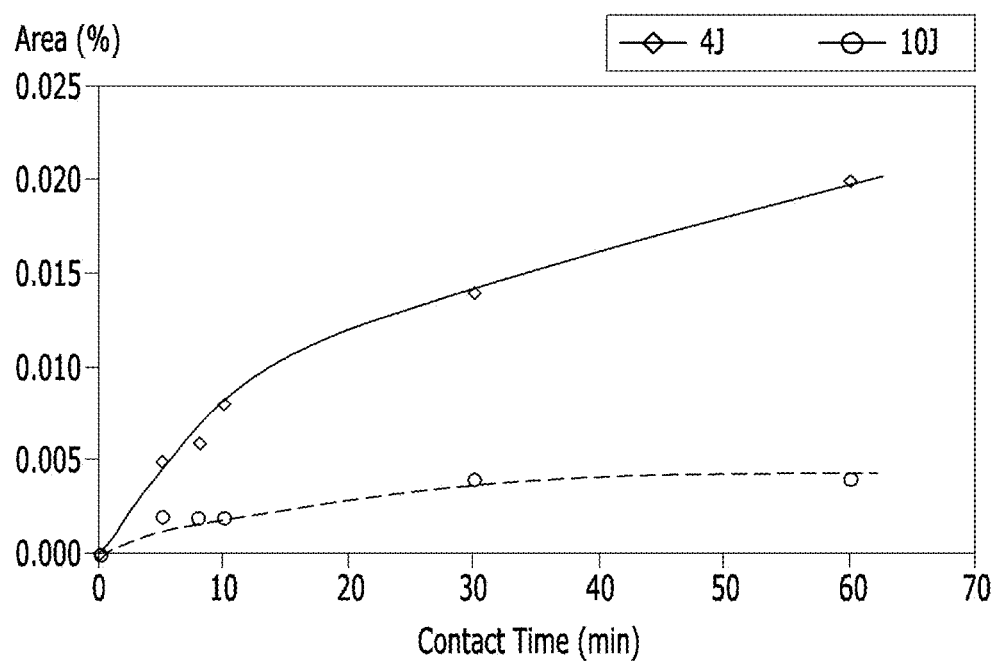
FIG. 16 is a graph of an area ratio of the compound represented by Chemical Formula 1 diffused into a liquid crystal layer versus contact time of a pseudo-cured overcoat and the liquid crystal layer (in minutes) obtained by measuring a diffusion amount of an exemplary embodiment of a compound represented by Chemical Formula 1 included in an overcoat according to the present invention into a liquid crystal layer.

FIG. 16 is a graph obtained by measuring a diffusion amount of an exemplary embodiment of the compound represented by Chemical Formula 1 included in the overcoat into the liquid crystal layer.

In order to measure the diffusion amount of the compound represented by Chemical Formula 1 included in an exemplary embodiment of the overcoat into the liquid crystal layer, after the overcoat was deposited on the substrate and pseudo-cured, a liquid crystal is applied in a predetermined amount on the pseudo-cured overcoat to measure the diffusion amount of the compound represented by Chemical Formula 1 during a pre-determined time.

Pseudo-curing of the overcoat was performed through radiation of UV of 4.0 J, and as a Comparative Example, pseudo-curing of the overcoat was performed through radiation of UV of 10.0 J.

A horizontal axis represents a contact time in minutes (min) of the pseudo-cured overcoat and the liquid crystal layer, and a vertical axis represents an area ratio of the compound represented by Chemical Formula 1 diffused into the liquid crystal.

As illustrated in FIG. 16, it could be confirmed that in the case of the overcoat pseudo-cured through radiation of UV of 4.0 J and 10.0 J, the compound represented by Chemical Formula 1 of the overcoat was diffused into the liquid crystal according to the contact time. Further, it could be confirmed that as compared to pseudo-curing through radiation of UV of 10.0 J, in pseudo-curing through radiation of UV of 4.0 J, a greater amount of the compound represented by Chemical Formula 1 of the overcoat was diffused into the liquid crystal layer.

Figure 17:
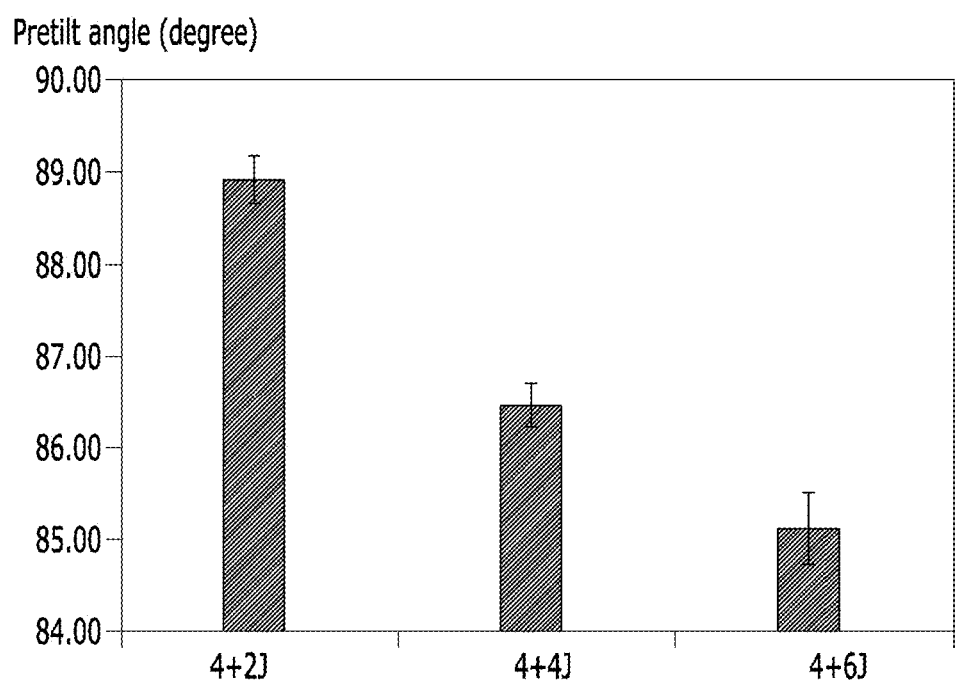
FIGS. 17 and 18 are charts obtained by measuring an exemplary embodiment of a pre-tilt angle of liquid crystal molecules formed by the compound represented by Chemical Formula 1 according to the present invention.
Figure 18:
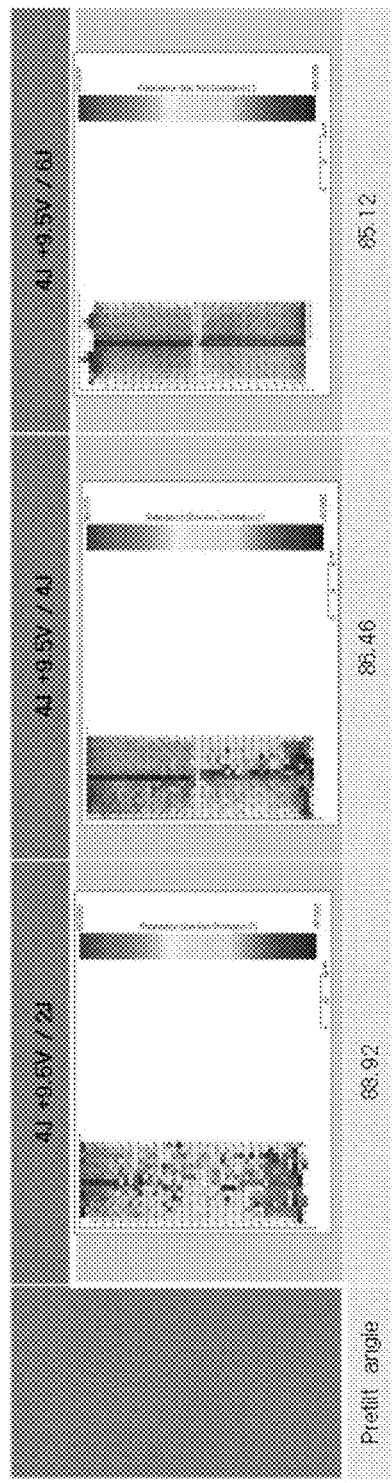
Figure 19:
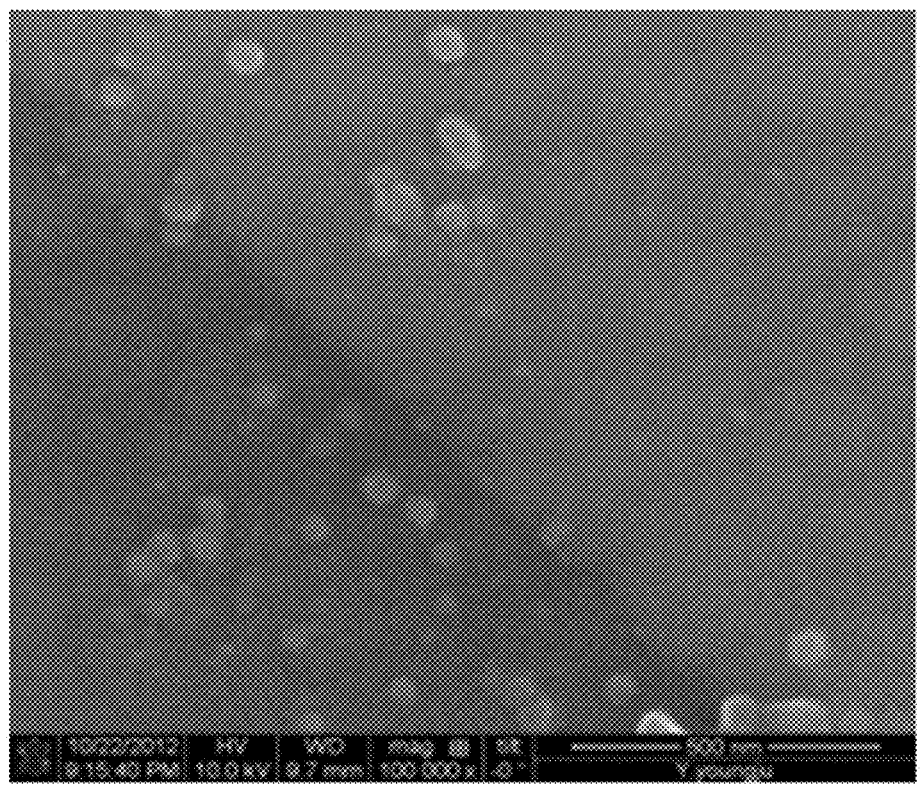
FIG. 19 is a scanning electron microscope ("SEM") photograph of an exemplary embodiment of a surface of an alignment layer according to the present invention.

Next, an experiment result showing that the pre-tilt angle of the liquid crystal molecules is formed by an exemplary embodiment of the compound represented by Chemical Formula 1 will be reviewed with reference to the following FIGS. 17 to 19.

FIGS. 17 and 18 are views obtained by measuring a pre-tilt angle of the liquid crystal molecules formed by an exemplary embodiment of the compound represented by Chemical Formula 1. FIG. 19 is a scanning electron microscope ("SEM") photograph of an exemplary embodiment of a surface of an alignment layer.

First, referring to FIGS. 17 and 18, in order to check whether various pre-tilt angles of the liquid crystal molecules could be formed, pseudo-curing of the overcoat was performed through radiation of UV of 4.0 J, and exposure when the compound represented by Chemical Formula 1 was polymerized in the alignment layer was performed through radiation of UV of 2.0 J, 4.0 J, and 6.0 J, respectively.

As illustrated in FIGS. 17 and 18, it could be confirmed that when the pre-tilt angle of the liquid crystal molecules was formed to be 89.92°, 86.26°, and 85.12° and thus polymerized the compound represented by Chemical Formula 1 in the alignment layer as exposure energy was increased. Therefore, the pre-tilt angle formed was small, and it could be confirmed that an exemplary embodiment of the compound represented by Chemical Formula 1 performed a role that was similar to that of the reactive mesogen.

Further, referring to FIG. 19, it could be confirmed that like an actual side chain of an alignment layer by the reactive mesogen, an exemplary embodiment of the compound represented by Chemical Formula 1 formed a protrusion structure on the surface of the alignment layer through SEM photography.

Although omitted in the drawings, in an exemplary embodiment, a polarizing plate may further be formed on upper and lower surfaces of the display device. The polarizing plate may be formed of a first polarizing plate and a second polarizing plate. The first polarizing plate may be attached to a lower surface of the substrate 110, and the second polarizing plate may be attached onto the overcoat 390.

A significant advantage of the aforementioned exemplary embodiments of the present invention, a is that in a display device manufactured by using one substrate, a pre-tilt angle of liquid crystal molecules may be formed by an efficient process using a resin component included in an overcoat.

A further advantage is that the pre-tilt angle of the liquid crystal molecules may be formed without a reactive mesogen by including the resin component in the overcoat.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A display device comprising:
a substrate;
a thin film transistor positioned on the substrate;
a pixel electrode connected to the thin film transistor;
an alignment layer positioned on the pixel electrode;
a liquid crystal layer including liquid crystal molecules formed on the alignment layer and positioned in a plurality of microcavities;
a roof layer positioned such that the roof layer is spaced apart from the pixel electrode with a microcavity interposed therebetween; and
an overcoat positioned on the roof layer and covering a trench positioned between the plurality of microcavities,
wherein in the liquid crystal layer, a pre-tilt angle manifestation group positioned to be adjacent to the alignment layer is formed, and
the pre-tilt angle manifestation group comprises a polymer of a compound represented by the following Chemical Formula 1:

[Chemical Formula 1]

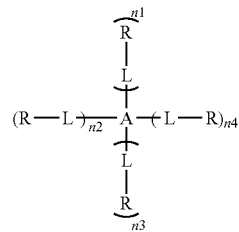

wherein L is each independently a single bond, an alkylene group, or an ester group, R is each independently an alkenyl group or a vinyl group, A is a trivalent or tetravalent aliphatic organic group or alicyclic organic group, a sum of n1 to n4 is 3 or 4, and n1 to n4 are each 0 or 1; and wherein the pre-tilt angle manifestation group further comprises a polymerization reaction group, and the polymerization reaction group comprises a compound represented by the following Chemical Formula 3:

[Chemical Formula 3]

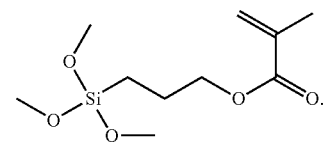

2. The display device of claim 1, wherein:
Chemical Formula 1 comprises at least one compound selected from the following Chemical Formula 1-1, the following Chemical Formula 1-2 and the following Chemical Formula 1-3:

[Chemical Formula 1-1]

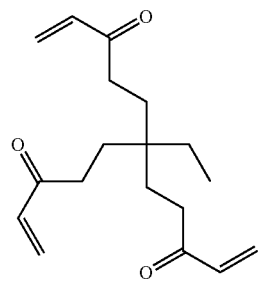

[Chemical Formula 1-2]

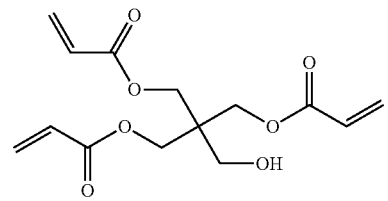

[Chemical Formula 1-3]

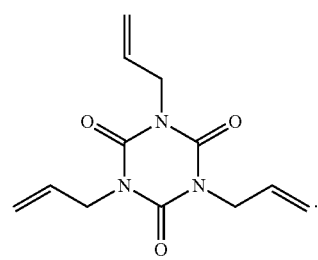

3. The display device of claim 2, wherein:
the liquid crystal molecule is disposed to form a pre-tilt angle on a surface of the pixel electrode, and
the pre-tilt angle of the liquid crystal molecule forms about 85 degrees to about 89 degrees based on the surface of the pixel electrode.

4. The display device of claim 1, wherein:
the pre-tilt angle manifestation group further comprises a photoreaction group.

5. The display device of claim 4, wherein:
the photoreaction group comprises a compound represented by the following Chemical Formula 2:

[Chemical Formula 2]

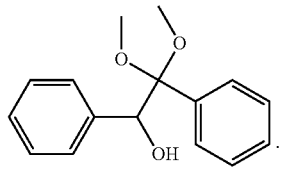

6. The display device of claim 1, wherein:
the overcoat comprises a compound represented by the following Chemical Formula 1:

[Chemical Formula 1]

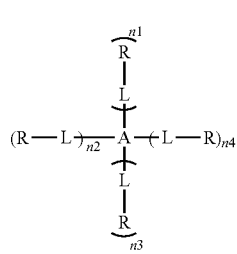

wherein L is each independently a single bond, an alkylene group, or an ester group, R is each independently an alkenyl group or a vinyl group, A is a trivalent or tetravalent aliphatic organic group or alicyclic organic group, a sum of n1 to n4 is 3 or 4, and n1 to n4 are each 0 or 1.

7. The display device of claim 1, wherein:
the liquid crystal layer comprises the compound represented by Chemical Formula 1.

8. A method of manufacturing a display device, comprising:
forming a thin film transistor on a substrate;
forming a pixel electrode connected to the thin film transistor on the thin film transistor;
forming a sacrificial layer on the pixel electrode;
forming a roof layer comprising an entrance portion by applying an organic material on the sacrificial layer and patterning the organic material;
forming a plurality of microcavities between the roof layer and the pixel electrode by removing the sacrificial layer;
forming an alignment layer by injecting an aligning agent through the entrance portion into the microcavity;
forming a liquid crystal layer by injecting a liquid crystal comprising liquid crystal molecules through the entrance portion; and
forming an overcoat covering the entrance portion on the roof layer to encapsulate the plurality of microcavities and including a compound represented by the following Chemical Formula 1,
wherein the forming of the overcoat comprises pseudo-curing the overcoat, and applying a voltage to the pixel electrode to perform exposure and thus form a pre-tilt angle manifestation group in the alignment layer:

[Chemical Formula 1]

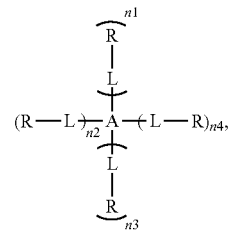

wherein L is each independently a single bond, an alkylene group, or an ester group, R is each independently an alkenyl group or a vinyl group, A is a trivalent or tetravalent aliphatic organic group or an alicyclic organic group, a sum of n1 to n4 is 3 or 4, and n1 to n4 are each 0 or 1; and wherein the pre-tilt angle manifestation group further comprises a polymerization reaction group, and
the polymerization reaction group comprises a compound represented by the following Chemical Formula 3:

[Chemical Formula 3]

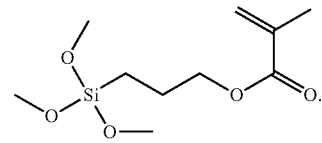

9. The method of claim 8, wherein:
Chemical Formula 1 comprises at least one compound selected from the following Chemical Formula 1-1, the following Chemical Formula 1-2 and the following Chemical Formula 1-3:

[Chemical Formula 1-1]

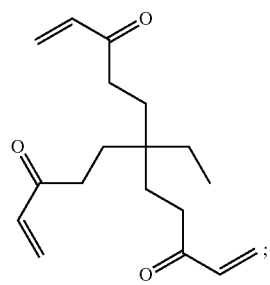

[Chemical Formula 1-2]

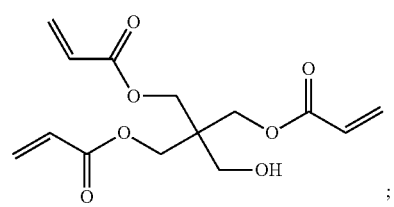

; and

-continued

[Chemical Formula 1-3]

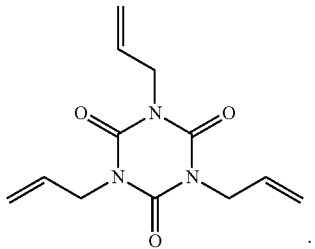

10. The method of claim 9, wherein:
the pseudo-curing of the overcoat is performed such that the overcoat is cured by about 40 percent to about 80 percent.

11. The method of claim 10, wherein:
the pseudo-curing is performed through exposure by energy of about 0.5 Joules to about 4.0 Joules.

12. The method of claim 8, wherein:
the forming of the overcoat further comprises, after forming the pre-tilt angle manifestation group, main-curing the overcoat.

13. The method of claim 8, wherein:
the overcoat further comprises a photoreaction group.

14. The method of claim 13, wherein:
the photoreaction group comprises a compound represented by the following Chemical Formula 2:

[Chemical Formula 2]

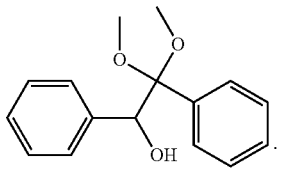

* * * * *